United States Patent [19]
Suzuki et al.

[11] Patent Number: 5,907,585
[45] Date of Patent: May 25, 1999

[54] DIGITAL SIGNAL DETECTING METHOD AND DETECTOR

[75] Inventors: Yasunori Suzuki; Ken Kumagai, both of Yokohama; Toshio Nojima, Yokosuka, all of Japan

[73] Assignee: NTT Mobile Communications Network Inc., Tokyo, Japan

[21] Appl. No.: 08/749,207

[22] Filed: Nov. 14, 1996

[30] Foreign Application Priority Data

Nov. 16, 1995 [JP] Japan .................................. 7-298707

[51] Int. Cl.$^6$ ................................................. H04L 27/14
[52] U.S. Cl. ...................... 375/324; 325/324; 325/332; 329/304
[58] Field of Search ................................... 375/344, 324, 375/261, 326, 328, 329, 332, 355; 329/261, 304, 306, 302

[56] References Cited

U.S. PATENT DOCUMENTS

| | | | |
|---|---|---|---|
| 5,398,002 | 3/1995 | Bang | 329/302 |
| 5,440,587 | 8/1995 | Ishikawa et al. | 375/332 |
| 5,473,280 | 12/1995 | Ohnishi et al. | 329/304 |
| 5,610,948 | 3/1997 | Ninomiya et al. | 375/324 |

*Primary Examiner*—Stephen Chin
*Assistant Examiner*—Shuwang Liu
*Attorney, Agent, or Firm*—Pollock, Vande Sande & Amernick

[57] ABSTRACT

An automatically gain-controlled analog received signal is AD converted to a digital signal, which is subjected to quadrature demodulation processing through operation. The quadrature demodulation result is subjected to low-pass filter processing through operation, that is, a digital detection is performed by software processing to a variable in each software processing in accordance with changes in the modulation method of the received signal and in the symbol transmission rate.

29 Claims, 18 Drawing Sheets

FIG.17A

| | MAX AMPLITUDE | n | SMOOTHING | ROLL-OFF RATIO | FIL COEFF |
|---|---|---|---|---|---|
| AUDIO | AM1 | n1 | ROM1 | RO1 | h1,h2,⋯,hn |
| IMAGE | AM2 | n2 | ROM2 | RO2 | h1,h2,⋯,hm |
| | | | | | |

FIG.17B

| MOD TYPE | MAX AMPLITUDE | n | SMOOTHING |
|---|---|---|---|
| QPSK | AM1 | n1 | ROM1 |
| 16QAM | AM2 | n2 | ROM2 |
| | | | |

FIG.17C

| CODE RATE | ROLL-OFF RATIO | FIL COEFF |
|---|---|---|
| B1 | RO1 | h1,h2,⋯,hn |
| B2 | RO2 | h1,h2,⋯,hm |
| | | |

5,907,585

DIGITAL SIGNAL DETECTING METHOD AND DETECTOR

BACKGROUND OF THE INVENTION

The present invention relates to a digital signal detecting method which permits the reception of signals modulated by different modulation schemes and send signals of various symbol transmission rates and a detector therefor.

To realize future multimedia communications, there is a demand for techniques of transmitting data, speech and images over the same digital radio channel. One possible means for effectively transmitting data, speech and images by digital radio communication is to use symbol transmission rates and modulation/demodulation schemes optimum for the objects to be transmitted. In the field of mobile communication, for instance, it is to be wished that the base station offer a service of providing still pictures of television, data bank or the like, whereas the mobile station be capable of receiving such still pictures from the base station by simple operation with simple equipment as well as conducting usual voice communications. In this instance, a QPSK modulation scheme is usually employed for the voice communication but a QAM or similar multilevel modulation scheme is needed for the transmission of still pictures because of the necessity for transmitting a larger amount of information than that required for the voice communication. This requirement could be met by providing independent transmitters and receivers each corresponding to a particular modulation/demodulation scheme as shown in FIG. 1A, in which the transmitting station is provided with a transmitter group 10 consisting of, for example, QAM, PSK and FSK modulating transmitters 11, 12 and 13 and the receiving station is provided with a receiver group 20 consisting of QAM, PSK and FSK receivers. Another method is common to the above in the provision of the independent transmitters 11, 12 and 13 at the transmitting side but differs therefrom in that the receiving station is equipped with a Single receiver 21 with QAM, PSK and FSK detectors 22, 23 and 24 built therein as shown in FIG. 1B. One possible method for providing a plurality of detectors in the same radio as shown in FIG. 1B is to build therein independent detectors each designed specifically for one modulation/demodulation scheme.

At present, mobile communication services are allocated 800 and 1500 MHz bands but cannot be switched back and forth between them. If the bands can be switched by a simple operation with a simple structure, however, cochannel interference can be reduced by using the 800 MHz band outdoors and the 1500 MHz band indoors and in closed spaces through utilization of a property that the linearity of electric waves in the 1500 MHz band is higher than in the 800 MHz band.

The device configuration depicted in FIG. 1B has a plurality of independent detectors built-in, and hence it is inevitably bulky and complex. Furthermore, in the digital radio communication for transmitting data, speech and images, it is hard to instantaneously switch the independent detectors by dynamically changing the demodulating scheme and the carrier frequency. The receiver 21 quadrature-demodulates the received signal, for which it is necessary to generate a local oscillation signal synchronized with the carrier of the input received signal. In this instance, if the carrier frequency of the received signal varies from $f_1$ to $f_2$, $f_3$, and $f_4$ with the lapse of time as shown in FIG. 2A, the frequency of the local oscillation signal also needs to vary correspondingly. To meet this requirement, it is general practice in the prior art to employ such a method as shown in FIG. 2B, in which the oscillation frequency of a PLL local oscillator 25 is switched by switching means 17 to $f_1$, $f_2$, $f_3$ and $f_4$ one after another as indicated by local oscillators $25_1$, $25_2$, $25_3$ and $25_4$, then the output from the switched local oscillator and the input modulated signal are multiplied by a multiplier 18 and the multiplied output is applied to a filter 19 to obtain a base band signal. The frequency switching speed in the PLL local oscillator 25 is several milliseconds at the highest even by the use of a digital loop preset type frequency synthesizer. With such a low response speed, it is impossible to fully respond to the frequency switching during communication.

For example, when the symbol transmission rate of the received signal varies from $B_1$ to $B_2$, $B_3$, and $B_4$ with the lapse of time as shown in FIG. 2C, it is conventional that filters $26_1$, $26_2$, $26_3$ and $26_4$ for filtering the output from a quadrature demodulator are switched one after another by switching means 27 and 28 in response to the variation in the transmission rate of the received signal as depicted in FIG. 2D. Since the filters are formed by hardware, the filter switching speed cannot be increased because of transient characteristics of the filters.

It is therefore an object of the present invention to provide a digital signal detecting method and a detector therefor which enable digital communication equipment having a plurality of detecting means built-in to be used in common to pluralities of modulation/demodulation schemes, local oscillation frequencies and symbol transmission rates.

Another object of the present invention is to provide a digital signal detecting method and a detector therefor which are capable of responding fast to the switching of the modulation schemes and a change in the symbol transmission rate.

SUMMARY OF THE INVENTION

A feature of the present invention is to obtain a base band signal by subjecting an AD converted received signal to digital signal processing implemented by software.

The digital signal detecting method according to the present invention comprises: a quadrature-demodulating step of performing a quadrature-demodulating operation of an AD converted received modulated signal; a filtering step of performing a filtering operation of the quadrature-demodulated signal to obtain a base band signal; and a control step of changing at least one process variable in at least one of the quadrature-demodulating step and the filtering step in response to a request for changing the process variable.

The quadrature-demodulating step comprises: an interpolating step of performing an n-point interpolation of the input modulated digital signal to interpolate therein samples at n points (n being a real number equal to or greater than 1); a multiplying step of complex-multiplying the interpolation result by a local oscillation signal; and a decimating step of performing an n-point decimation of the multiplication result to decimate therefrom samples at n points. The process variables that can be changed in the quadrature demodulation step are the frequency, amplitude and phase of the local oscillation signal and the value of the above-mentioned n.

The filtering step comprises a smoothing step of smoothing the result of the quadrature-demodulating operation to reduce the number of samples; and a digital filtering step of performing a band-limiting operation of the result of the smoothing operation. The process variables in the band-limiting step are the number of smoothing points and the characteristic of the digital filter used.

Further, the input modulated signal is gain controlled by an automatic gain controller for input into an AD converter as a signal of a predetermined level range.

The above-mentioned various processes are performed by a microprocessor which decodes and executes programs.

BRIEF DESCRIPTION OF THE DRAWINGS

FIG. 17A is a table showing, by way of example, stored contents of a process variable storage part;

FIG. 17B is a table showing, by way of example, some of other stored contents of the process variable storage part; and FIG. 17C is a table showing, by way of example, stored contents in other areas of the storage part of FIG. 17B.

DESCRIPTION OF THE PREFERRED EMBODIMENT

Figure 3:
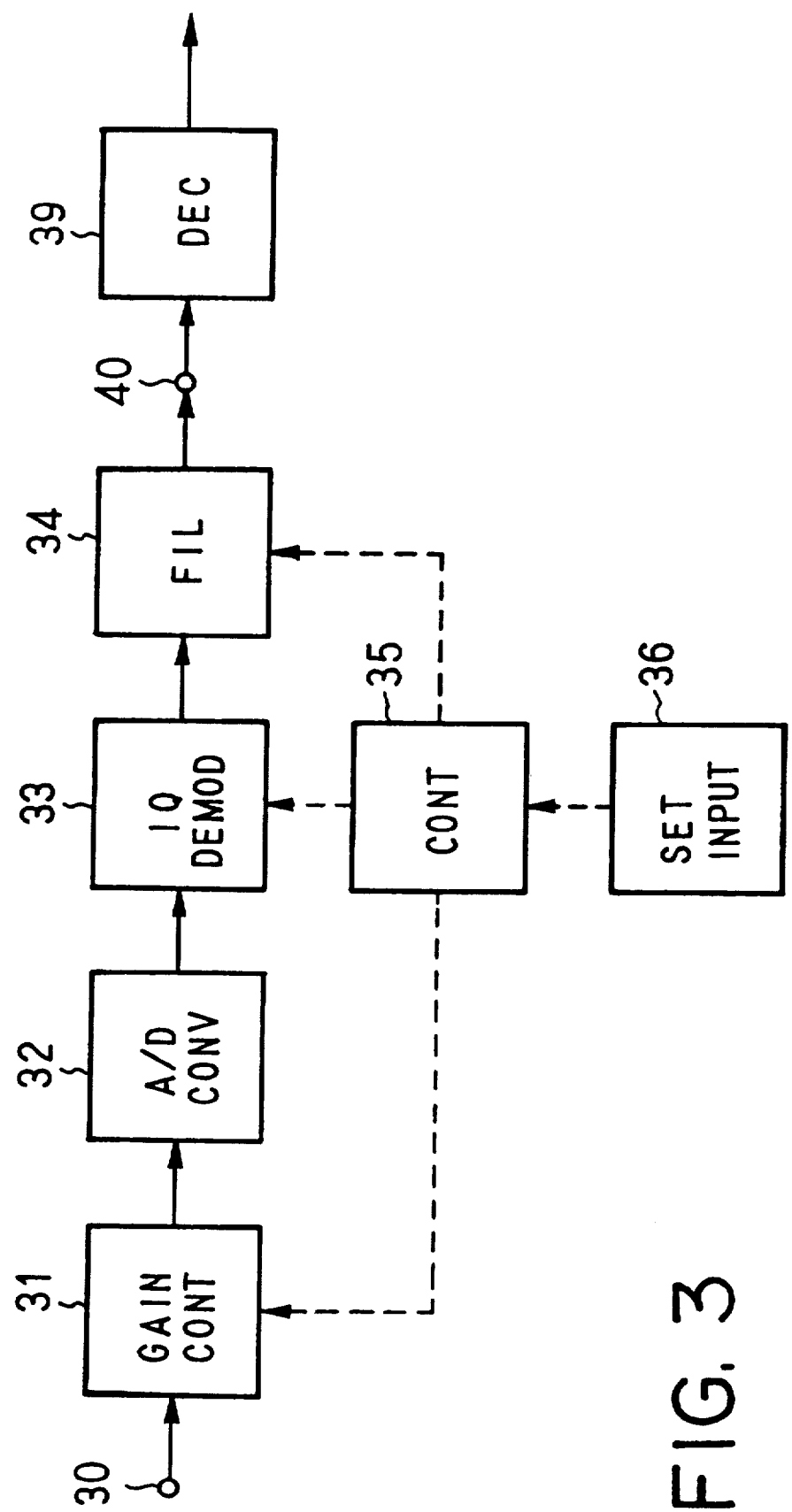
FIG. 3 is a block diagram illustrating the functional configuration of the detector according to the present invention.

Referring now to FIG. 3, an embodiment of the present invention will be described below. An analog signal received at an input terminal 30 is provided via a band pass filter (not shown) to an automatic gain controller 31, which controls, with its amplification gain, the received signal so that its amplitude varies within a fixed range. The output analog signal from the automatic gain controller 31 is converted by an AD converter 32 to a digital signal. The received signal thus converted into digital form is subjected to demodulating operation by quadrature demodulating means 33 and is spectrum shaped by filtering operation by digital filter means 34, from which a demodulated digital base band signal is provided at an output terminal 40. The base band signal is provided to decision means 39, wherein its in-phase component and quadrature component are each decided in terms of the symbol period, and based on these decision results, it is determined which signal point on the IQ-diagram the base band signal corresponds to. For example, in the case of a QPSK signal, it is decided whether its in-phase component and quadrature component are +1 or −1, and based on the decision results, it is determined which of four signal points on the IQ-diagram the baseband signal corresponds to.

In FIG. 3, the arithmetic processing for the digital signal by the quadrature demodulating means 33 and the digital filter means 34 is implemented by software which uses the sampling frequency, the symbol transmission rate, the modulation scheme and the local oscillation frequency as arguments (variables). Control means 35 has software for controlling the automatic gain controller 31, the quadrature demodulating means 33 and the digital filter means 34. The control means 35 controls the automatic gain controller 31 to vary its amplification gain to limit the amplitude variation of the base band signal to a fixed range. The control means 35 controls arguments set in the quadrature demodulating means 33 and the digital filter means 34 in response to changes in the sampling frequency, the symbol transmission rate and the modulation scheme of the digitized modulated signal and the local oscillation frequency. A keyboard or similar set/input means 36 is connected to the control means 35. The set/input means 36 has pluralities of keys indicating several sampling frequencies, several symbol transmission rates and several local oscillation frequencies, respectively, and a desired parameter is input by pressing the corresponding one of the keys indicating several parameters of each category. Alternatively, the input means 36 is provided with keys each indicating the sampling frequency, the symbol transmission rate and the local oscillation frequency and has a construction in which a desired parameter can be input by pressing the corresponding key and its numerical value can be set and input by manipulating ten keys. Further, the set/input means 36 has a plurality of keys respectively indicating modulation schemes so that the modulation scheme of the received signal can be input.

As described above, the digital signal processing by the quadrature demodulating means 33 and the digital filter means 34, which uses the sampling frequency, the symbol transmission rate, the modulation scheme and the local oscillation frequency as variables, can be implemented by software. By controlling the gain of the automatic gain controller 31 and the variables with the software of the control means 35, it is possible to construct a digital signal detector which performs an operation corresponding to a parameter specified in one of the groups of modulation schemes, local oscillation frequencies and symbol transmission rates.

Figure 4A:
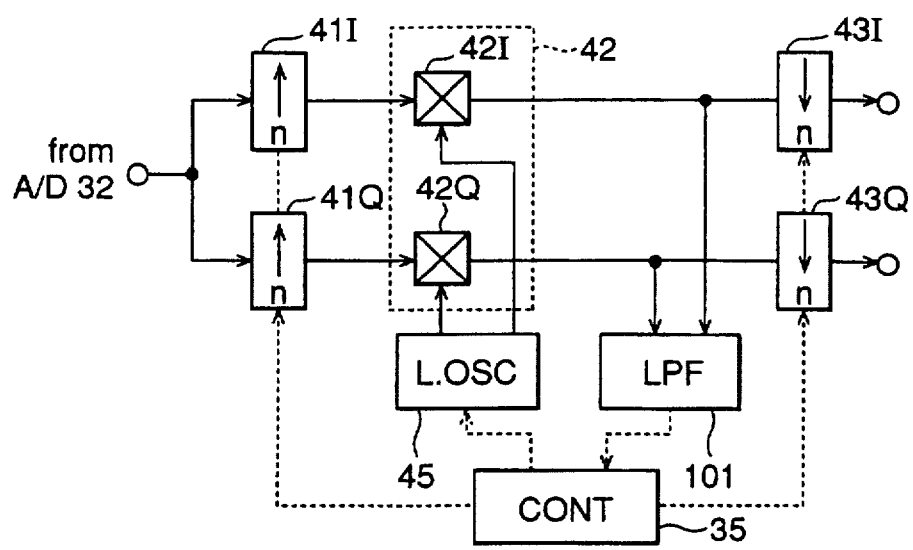
FIG. 4A is a block diagram illustrating a concrete example of the functional construction of quadrature demodulating means 33 in FIG. 3.

FIG. 4A shows a preferred configuration of the quadrature demodulating means 33 in FIG. 3. The output digital signal from the AD converter 32 is subjected to an n-point interpolation by n-point interpolation means $41_I$ and $41_Q$, whereby samples are interpolated in the digital signal at n points on the time base. The interpolated signals are fed to multiplying means $42_I$ and $42_Q$, wherein they are multiplied by 90°-out-of-phase signals $f_{LI}(k)$ and $f_{LQ}(k)$ from local oscillation means 45. The outputs from the multiplying means $42_I$ and $42_Q$ are subjected to an n-point decimation by n-point decimation means $43_I$ and $43_Q$, whereby samples are decimated from the multiplied outputs at n points on the time base. By this decimation processing, the samples interpolated by the n-point interpolation means $41_I$ and $4_Q$ are decimated from the multiplied outputs, whereby the in-phase and quadrature components of the demodulated signal from the quadrature demodulation means 33 can be obtained. The time resolution for the multiplication processing can be scaled up by the n-point interpolation means $41_I$ and $41_Q$. The scaled-up time resolution permits the establishment of synchronization between the digitized modulated signals and the local oscillation signals with high accuracy, and the time resolution of the multiplied outputs is scaled down by the n-point decimation means $43_I$ and $43_Q$, lessening the load of subsequent digital signal processing. The multiplying means $42_I$ and $42_Q$ constitute a complex multiplying means 42.

A description will be given of the arithmetic operation by the quadrature demodulating means 33. The input analog signal (an IF signal) y(t) to the AD converter 32 can be expressed by. the following equation.

$$y(t)=A(t)\cos\{\omega t+\phi(t)\} \tag{1}$$

where t is time, ω is 2πf (where f is the carrier frequency), A(t) is the envelope and φ(t) is the phase. The analog signal y(t) is sampled by the AD converter 32 every sampling time $T_s$ and each sample value is converted to a digital signal. Letting m denote an integer, the time t and the sampling time $T_s$ bear the following relationship.

$$t=mT_s \tag{2}$$

The digital-signal $y_s(mT_s)$ converted from the analog signal y(t) can be expressed as follows:

$$y_s(mT_s)=A_s(mT_s)\cos\{\omega mT_s+\phi_s(mT_s)\} \tag{3}$$

where $A_s(mT_s)$ is a sampled value of the envelope at time $mT_s$ and $\phi_s(mT_s)$ is a sampled phase value of the phase φ(t) at time $mT_s$.

Normalizing the time in Eq. (3) with the sampling time $T_s$ gives $$y_s(m)=A_s(m)\cos\{\omega m+\phi_s(m)\} \tag{4}$$

Next, the time sequence of digital signals given by Eq. (4) is subjected to an n-point interpolation operation to insert therein samples at n points, thereby interpolating the digitized received signals. The n-point interpolation result $y_u$ is given as follows:

| | | |
|---|---|---|
| $y_u(k) =$ | $y_s(k/n)$ | ... (5) |
| $=$ | $A_s(k/n)\cos\{(\omega(k/n) + \phi_s(k/n)\}$ | ... (6) |

This interpolation value is calculated by the interpolation algorithm described later on. As the result of this, the amount of data of the interpolation result $y_u(k)$ on the time base becomes n times larger than the amount of data of the digital-signal time sequence $y_s(m)$.

The local oscillation means 45 outputs the local oscillation signal $f_L(k)$ synchronized with an angular velocity φ.

$$f_L(k)=B_L \exp\{j\phi(k/n)\} \tag{7}$$

where $B_L$ is the amplitude of the local oscillation signal $f_L(k)$ and exp(·) is an exponential function, $f_L(k)$ being a complex number. The digital multiplying means 42 multiplies the n-point interpolation result $y_u(k)$ by the local oscillation signal $f_L(k)$.

$$z_u(k)=y_u(k)\cdot f_L(k) \tag{8}$$

The multiplication result $z_u(k)$ is the output from the multiplying means 42, which is a complex number. The multiplication result $z_u(k)$ is subjected to an n-point decimation operation by n-point decimation means 43 to decimate samples in the time sequence every n points. The decimation result $z_d$ is as follows:

| | | |
|---|---|---|
| $Z_d(p) =$ | $Z_u(pn)$ | ... (9) |
| $=$ | $y_u(pn) \cdot f_L(pn)$ | ... (10) |
| $=$ | $y_s(pn/n) \cdot f_L(pn)$ | ... (11) |
| $=$ | $y_s(p) \cdot f_L(pn)$ | ... (12) |

The number of samples of the interpolation result $z_u$ on the time base becomes n/1 the number of samples of the multiplication result $z_u(k)$. As long as the n-point interpolation means 41 and the n-point decimation means 43 are used, the $z_d(p)$ sampling interval in the AD converter 32 always equals the sampling time $T_s$.

Figure 4B:
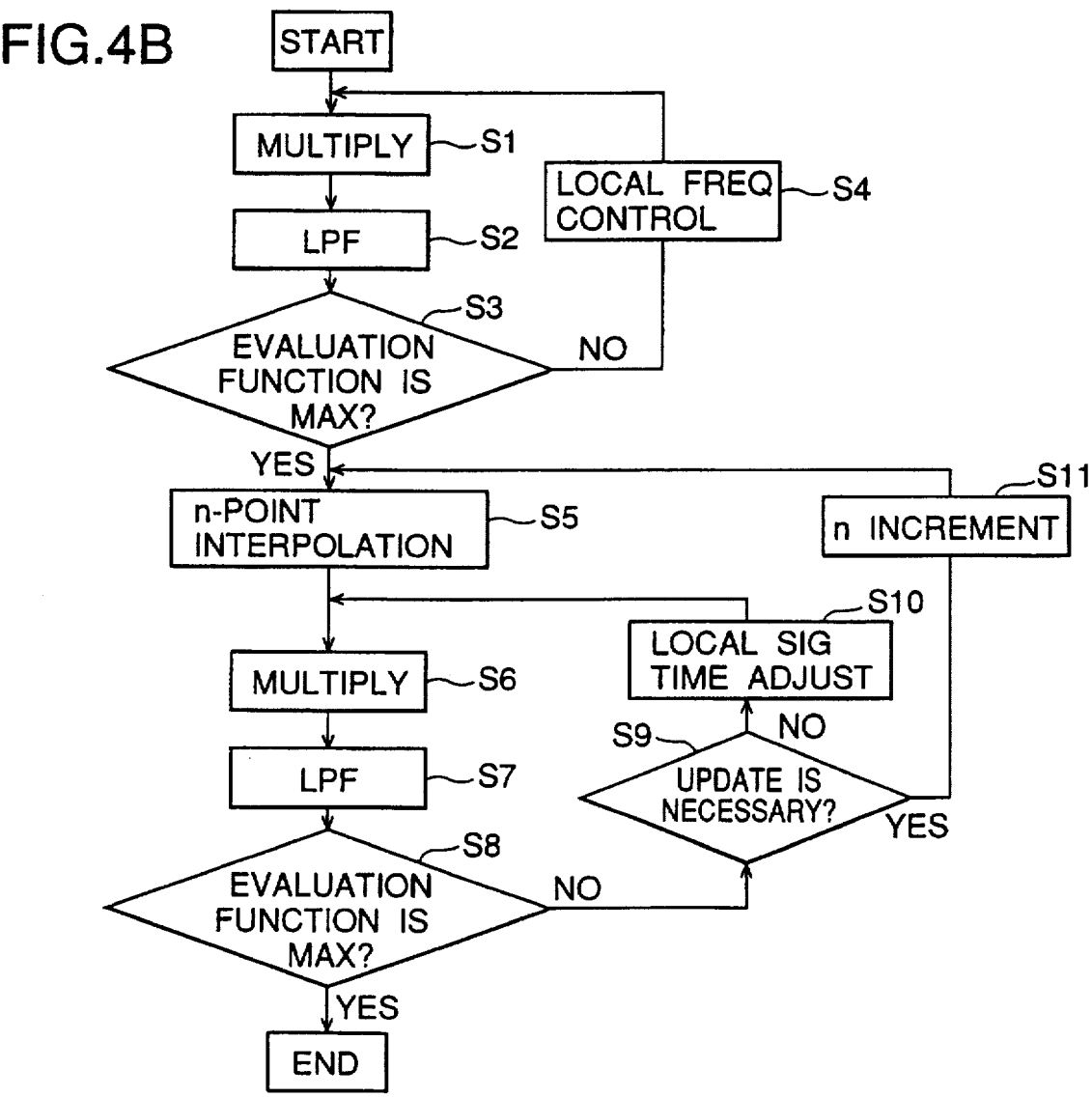
FIG. 4B is a flowchart showing an example of a procedure for automatic synchronization of the local oscillation signal with the input received signal.

At the start of demodulation processing, the local oscillation signal $f_L(m'T_s)$ from the local oscillation means 45 is synchronized with the received signal, i.e. the input signal $y_s(mT_s)$ to the quadrature demodulation means 33 for accurate synchronous detection processing in order that the operation result by the quadrature demodulation means 33 may be processed as a demodulation result by the filter means $34_s$. This synchronization processing is carried out following the procedure shown in FIG. 4B, for instance. In the first place, the output which is obtained from each of the n-point interpolation means $41_I$ and $41_Q$ when n is set to zero, that is, the uninterpolated digital signal $y_s(mT_s)$, is multiplied by the local oscillation signal $f_L(m'T_s)$ (S1).

$$z_s(m) = y_s(mT_s) f_L(m'T_s) \quad (13)$$

$$z_s(m) = A_s(m) \cos(2\pi fmT_s + \theta) B_L \cos(2\pi f'mT_s) \quad (14)$$

$$z_s(m) = (\tfrac{1}{2}) A_s(m) B_L [\cos(2\pi(fm - f'm')T_s + \theta) + \cos(2\pi(fm + f'm')T_s + q(\theta))] \quad (15)$$

This zs(m) is subjected to low-pass filtering ($S_2$) to extract a difference frequency component $\hat{z}_s(m)$ which is given by the following equation.

$$\hat{z}_s(m) = (\tfrac{1}{2}) A_s(m) B_L \cos[2\pi(fm - f'm')T_s + \theta] \quad (16)$$

Normalizing the amplitude and the initial phase in Eq. (16) gives $$z'_s(m) = \cos(fm - f'm') \quad (17)$$

$2\pi f = \omega$ and $2\pi f' = \omega'$. The $z_s'(m)$ by Eq. (17) is called an evaluation function, and the local oscillation frequency f' is so controlled as to maximize the evaluation function $z_s'(m)$. That is, a check is made to see if the evaluation function has become maximum (S3), and if not, the frequency f' of the local oscillation signal $f_L(m'Ts)$ is adjusted so that the evaluation function $z_s'(m)$ becomes maximum, followed by a return to step S1 (S4). When the evaluation function $z_s'(m)$ becomes maximum, the input signals $y_s(mT_s)$ and the local oscillation signal $f_L(m'T_s)$ are subjected to n-point interpolation processing (S5), and the resulting interpolated signals $y_s(k\Delta)$ and $f_L(k'\Delta)$ (where $n\Delta = Ts$) are multiplied (S6). The multiplication result is subjected to low-pass filter processing to obtain the difference frequency component (S7). A check is made to see if an evaluation function $z_s'(k) = \cos(fk - fk')$ similar to that in step S3 is maximum (S8), and if not, it is determined whether the interpolation number n needs to be changed (S9); if not, the k' in the local oscillation signal $f_L(k'\Delta)$ is so adjusted as to maximize the evaluation function $z_s'(k)$, followed by a return to step S6 (S10). A check is made to see whether the interpolation number n needs to be changed, that is, whether the evaluation function $z_s'(k)$ is larger than a threshold value. If the evaluation function $z_s'(k)$ is larger than the threshold value and will hardly change even if the interpolation number n is increased, the interpolation number n is increased by 1 or so, followed by a return to step S5 (S11). When the evaluation value $z_s'(k)$ is maximum, it is decided that the received signal and the local oscillation signal are synchronized with each other, and synchronization control comes to an end.

When the evaluation function $z_s'(k)$ hardly increases even if the interpolation number n is increased, the interpolation number n of the smaller value is used in the subsequent processing, that is, the evaluation function $z_s'(k)$ is made maximum and the interpolation number n minimum for synchronization with high accuracy and for minimum computational complexity. In the above, since the adjustable minimum value of the local oscillation signal $z_s(k'\Delta)$ in step S10 is k'=1, i.e. the sample interval $\Delta$ after interpolation, the accuracy of synchronization of the local oscillation signal $f_L(m'T_s)$ with the input signal $y_s(mT_s)$ increases with an increase in the interpolation number n. Incidentally, low-pass filter means 101 in FIG. 4A is means for carrying out the processing of steps S2 and S7 in FIG. 4B.

Figure 5A:
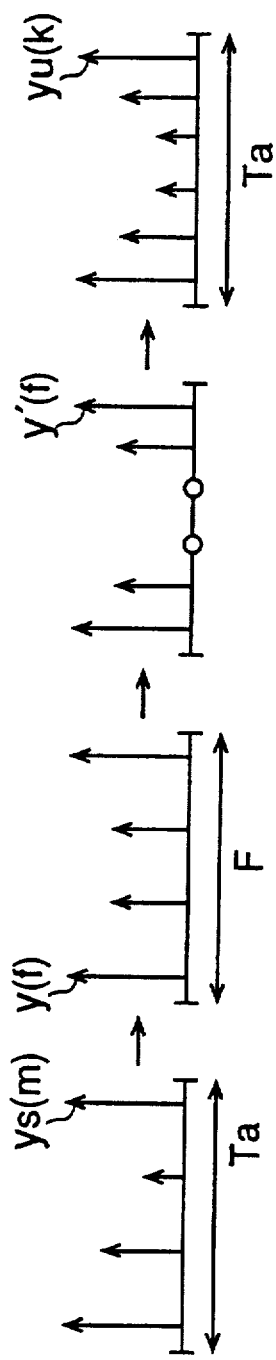
FIG. 5A is a diagram explanatory of n-point interpolation processing by an FFT technique.

Next, a description will be given of a concrete interpolation processing method for the interpolation means $42_I$ and $42_Q$. As shown in FIG. 5A, the time sequence signal $y_s(m)$ of the sampling period $T_s$ is transformed by fast-Fourier-transform (FFT) processing into a frequency domain signal y(f) for each period Ta, and a zero point is inserted into the signal y(f) on the frequency axis to obtain a signal y'(f), which is transformed by inverse fast-Fourier-transform (IFFT) processing into a time sequence signal $y_u(k)$ which has an increased number of samples per time Ta. This interpolation method by FFT ensures high reliability of signals interpolated when the number of interpolated samples is large. This method is described in, for example, Toshinori Yoshikawa et al., "Numerical Calculation in Engineering," pp. 183, Nihon Rikoh Kai, 1984.

Figure 5B:
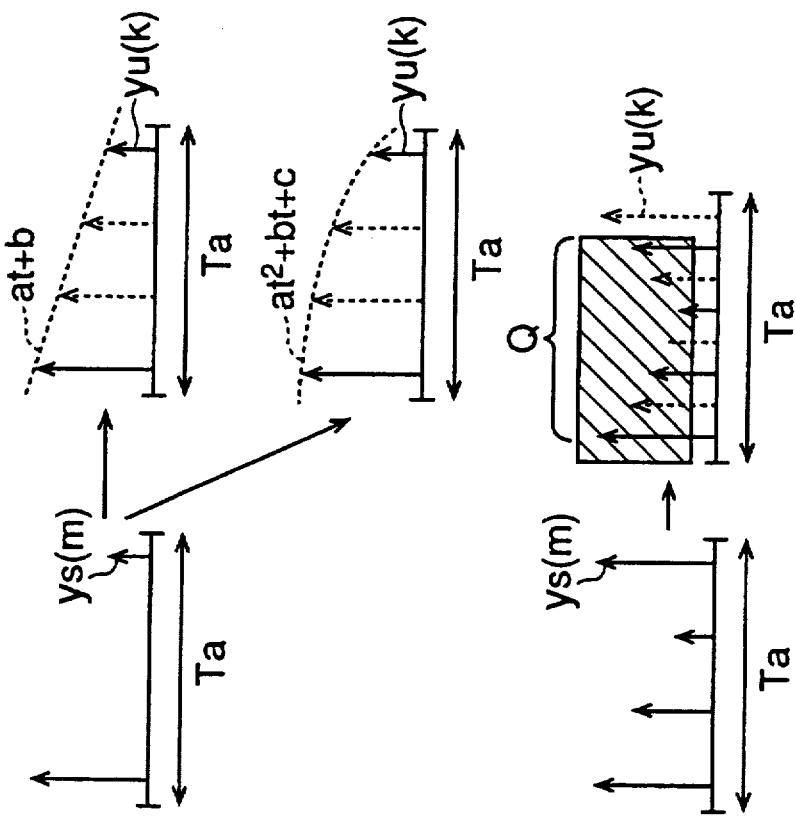
FIG. 5B is a diagram explanatory of a method for performing the n-point interpolation processing by an interpolation algorithm using an m-order function.

Another method is shown in FIG. 5B, in which sample values which are determined by a linear function at+b or quadratic function $at^2 + bt + c$ are interpolated between adjacent actual sample values of the time sequence signal $y_s(m)$ for each period Ta as indicated by the broken line to obtain the time sequence signal $y_u(k)$ which has an increased number of samples per time Ta. Such a method of interpolating samples estimated by a linear m-order function is simple and easy. With this method, the computational complexity is low and reliability is relatively high when the number of interpolated samples is small.

Figure 5C:
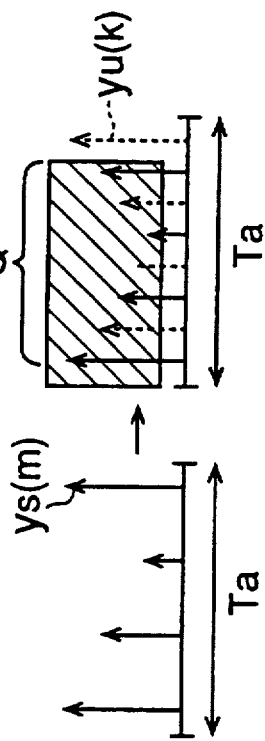
FIG. 5C is a diagram explanatory of a method for performing the n-point interpolation processing by a method of estimating samples to be interpolated by an interpolation algorithm.

It is also possible to use such a method as shown in FIG. 5C, in which Q previous samples of the time sequence signal $y_u(k)$ derived by interpolation from the time sequence signal $y_s(m)$ are used to estimate, by an adaptive algorithm, the samples to be interpolated next and the estimated samples are interpolated into the next time sequence signal $y_s(m)$ to obtain the time sequence signal $y_u(k)$. The adaptive algorithm for the estimation of samples needs only to have been optimized for or with respect to Gaussian noise; a Kalman Filter algorithm, least means squares algorithm, recursive least square algorithm, Newton method, or steepest descent method can be used. With this method, it is possible to interpolate samples into the time sequence signal while compensating for the degradation of the signal by the transmission line to some extent.

Figures 6A, 6B:
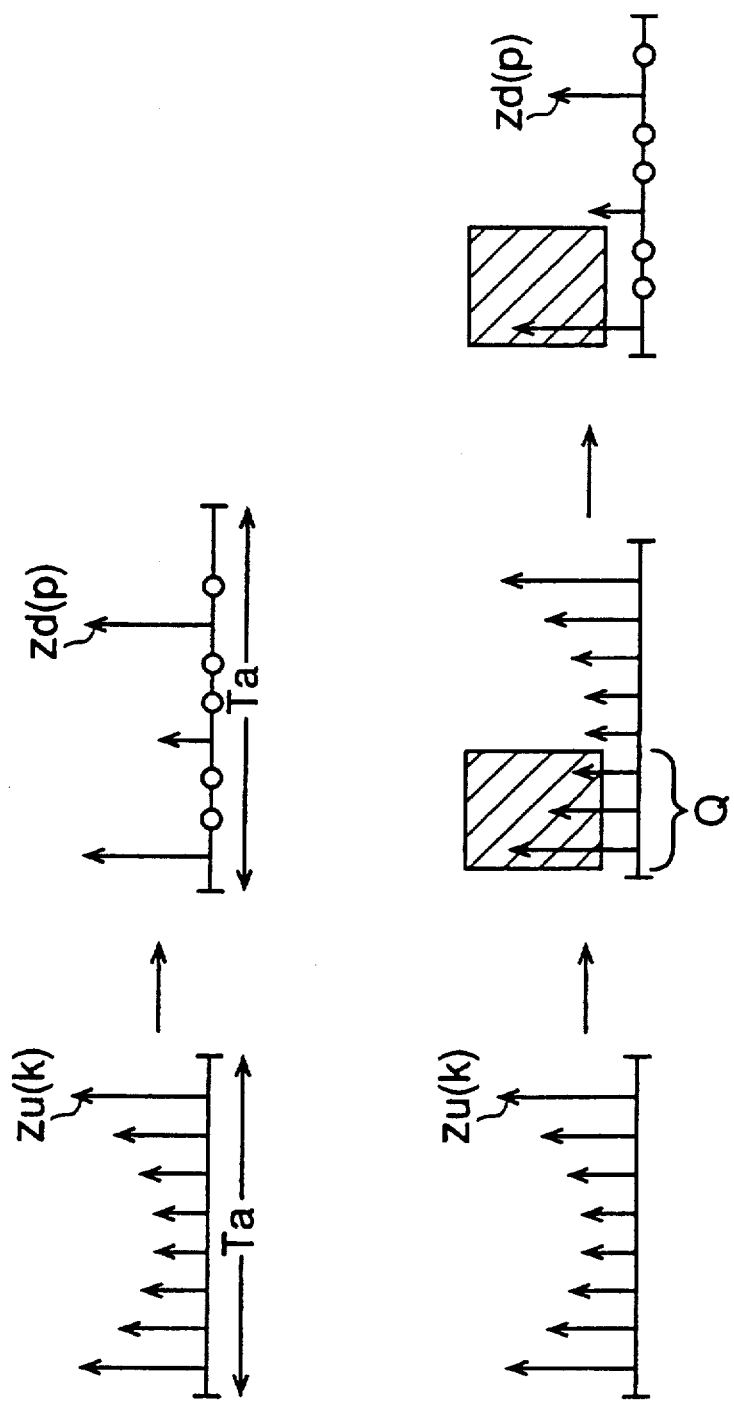
FIG. 6A is a diagram explanatory of n-point decimation processing by a simple decimation method.
FIG. 6B is a diagram explanatory of n-point decimation processing by a weighted substitution method.

Next, a concrete example of the decimation processing method by the decimation means $43_I$ and $43_Q$ in FIG. 4A will be described. For example, as shown in FIG. 6A, samples of the same number as those interpolated by each of the interpolating means $41_I$ and $41_Q$ are simply decimated from the time sequence signal $z_u(k)$ for each period Ta to obtain a time sequence signal $z_d(p)$ which has a decreased number of samples per time Ta. The processing by this method is very simple and easy.

Alternatively, as shown in FIG. 6B, an evaluation function is used to perform operation processing of a plurality Q (three in FIG. 6B) of samples in the time sequence signal $z_u(k)$ to obtain one sample, thus decimating samples in the time sequence signal $z_u(k)$ to obtain the time sequence signal $z_d(p)$. The evaluation function may be a function for calculating a mean value or centroids of a plurality of samples. With this method, information about the samples to be decimated can be reflected by the evaluation function on the samples left undecimated.

Figure 7:
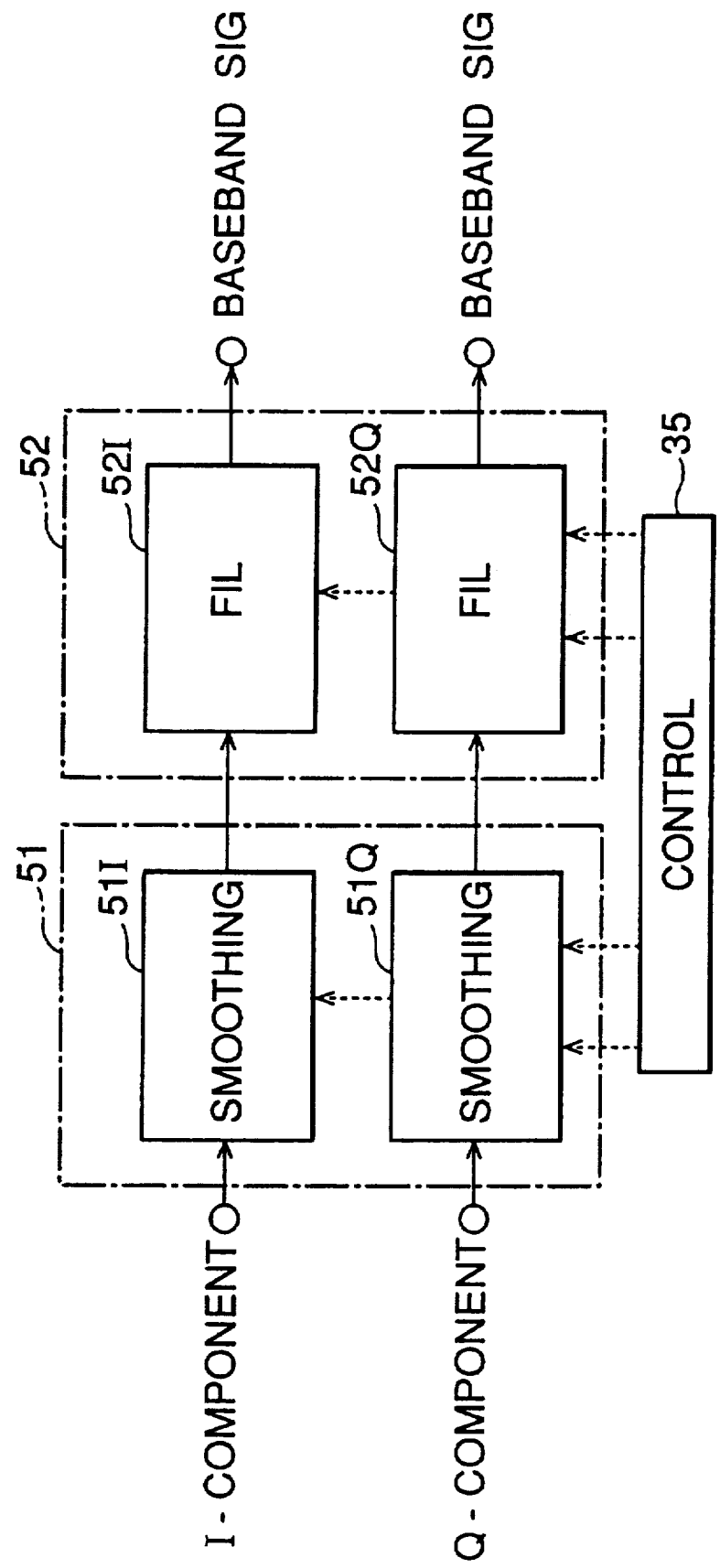
FIG. 7 is a block diagram illustrating a concrete example of the functional configuration of filter means 43 in FIG. 3.

The digital filter means 34 in FIG. 3 performs a filtering operation and a smoothing operation. As shown in FIG. 7, the in-phase and quadrature component outputs from the quadrature demodulating means 33, that is, the outputs from the n-point decimation means $43_I$ and $43_Q$ in FIG. 4A, are smoothed by smoothing means $51_I$ and $51_Q$, respectively, by which the number of samples on the time base is reduced within the range that meets the Nyquist sampling theorem. In other words, a plurality of samples is reduced by the averaging down to one. This enables decimation processing on the time base. Based on the processing results by the smoothing means $51_I$ and $51_Q$, the orders of filter coefficients can be lowered by digital filter means $52_I$ and $52_Q$, respectively. The smoothing of samples is expressed by the following equation.

$$z_{ds}(p_s) = g(\ldots, z_d((k-1)p), z_d(kp), \ldots) \quad (18)$$

where $g(\cdot)$ is a function indicating the smoothing processing, $p_s$ is a normalization variable of the output by the smoothing processing and $z_{ds}$ is a complex signal which is the output from the smoothing means 51. The smoothing processing averages signals at m points, for example, to reduce the number of samples down to 1/m. The signal $z_{ds}(p_s)$ is band-limited by the filter means 52. This is expressed by the following equation.

$$\hat{z}(p_s) = h(z_{ds}(p_s)) \quad (19)$$

where $h(\cdot)$ is a signal processing function of the filter means 52, $\hat{z}$ is the filter processing output signal and $\hat{z}(\cdot)$ is a complex number. The quadrature demodulating operation, the smoothing operation and the filtering operation may be carried out as a complex operation for each of the in-phase and the quadrature component as shown in FIGS. 4 and 7; alternatively, such a complex operation as indicated by the above equations may directly be conducted.

Figure 8A:
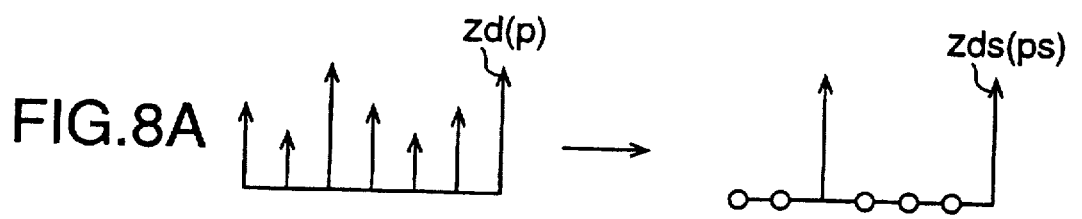
FIG. 8A is a diagram explanatory of smoothing processing by a simple extraction method.
Figure 8B:
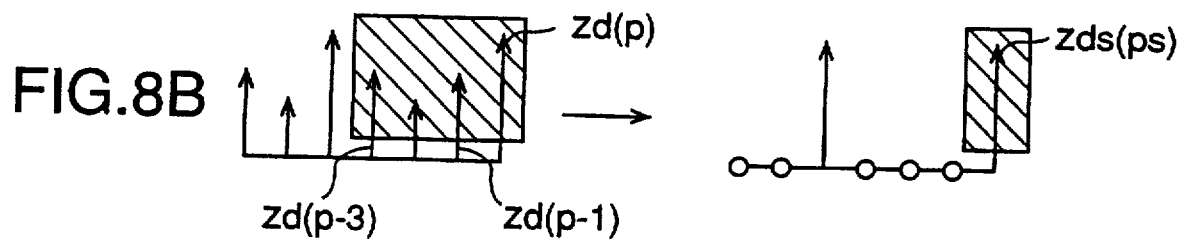
FIG. 8B is a block diagram showing an example of the functional configuration for another smoothing scheme.

A concrete method for the processing by the smoothing means 51 in FIG. 7 will be described. FIG. 8A shows the simplest method according to which N samples are decimated from the time sequence signal $z_d(p)$ from the quadrature demodulating means 33 every N+1 samples to obtain the smoothed time sequence signal $z_{ds}$ ($p_s$). Smoothing processing by a linearly weighting scheme is shown in FIG. 8B, in which the time sequence signal $z_{ds}$ (p) is fed directly to multiplying means $M_0$ (FIG. 8C) and, at the same time, it is applied to delay means $D_1, \ldots, D_L$, from which signals delayed by sampling periods $T_s, 2T_s, \ldots, Lt_s$ of the time sequence signal $z_d(p)$, respectively, are provided to multiplying means $M_1, \ldots, M_L$. The inputs into the multiplying means Mo, $M_1, \ldots, M_L$ are multiplied by weights $f_0, f_1, \ldots, f_L$, respectively, then the multiplication results are added together by adder means $S_u$, and the addition result is output therefrom as the time sequence signal $z_{ds}(p_s)$ smoothed every L+1 samples. That is, the signal $z_{ds}(p)$ is assigned the weights $f_0, \ldots, f_L$ every L samples, then added together to form one sample of the smoothed signal $z_{ds}(p_s)$.

$$z_{ds}(p_s) = f_0 \cdot z_d(p) + f_1 \cdot z_d(p-1) + \ldots + f_L \cdot z_d(p-L)$$

Figure 8C:
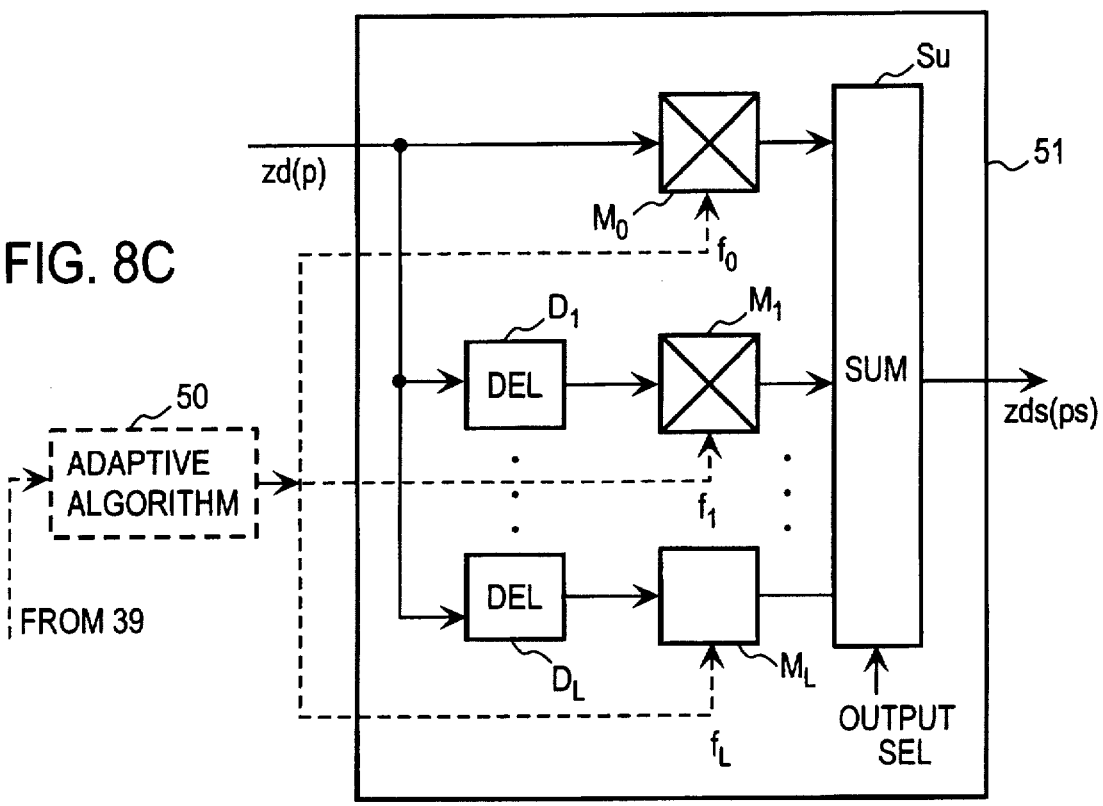
FIG. 8C is a diagram for explaining the operation of the FIG. 8B configuration.

When L=3, four samples $z_d(p-s)$ to $z_d(p)$ are linearly weighted and output as one sample $z_{ds}(p_s)$ as shown in FIG. 8C.

To perform the smoothing processing by the adaptive filtering scheme, the weighting coefficients $f_0, \ldots, f_L$ are changed by adaptive algorithm processing means 50 through the use of an adaptive algorithm so as to optimize the decision result from the received data decision means as indicated by the broken lines in FIG. 8C. The weighting coefficients are determined first, for example, in a pilot signal (training signal) period in which received data is already known. The adaptive algorithm for use in this case may be a Kalman Filter algorithm or those derived therefrom.

Figure 9A:
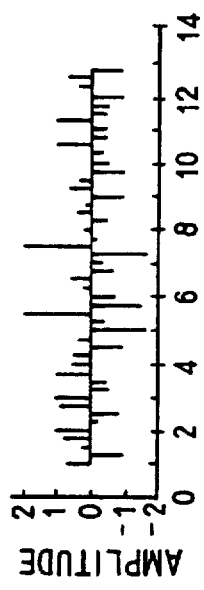
FIGS. 9A through 9H are diagrams showing the states of signals occurring at respective parts of the digital detector according to the present invention.
Figure 9B:
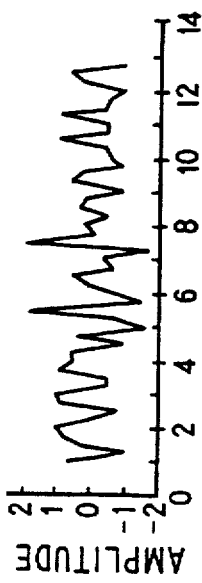
Figure 9C:
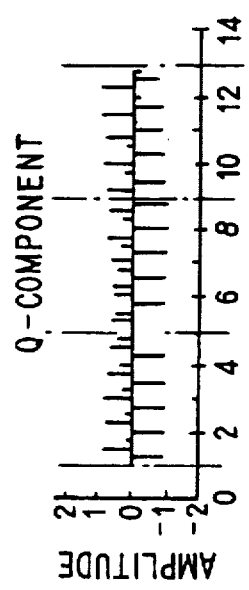
Figure 9D:
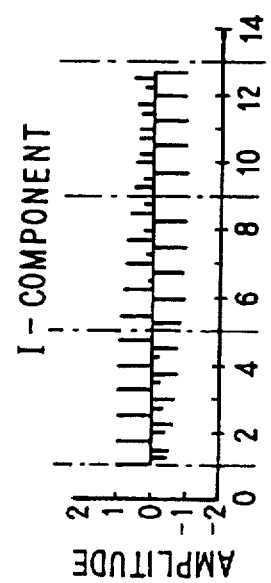
Figure 9E:
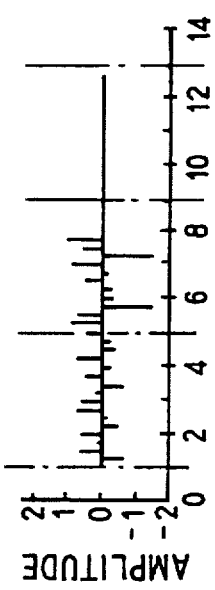
Figure 9F:
Figure 9G:
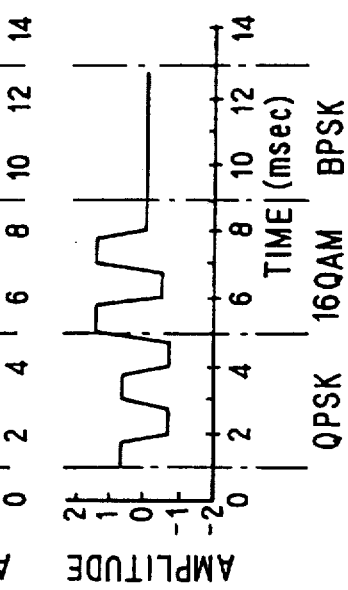
Figure 9H:
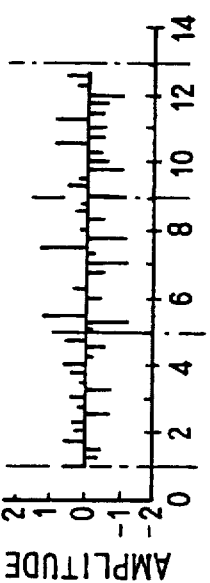

Next, a description will be given, with reference to FIG. 9, of a specific operative example of a method for detecting signals of different modulation schemes according to the present invention. A received analog signal shown in FIG. 9A, whose amplitude component is limited to a certain range by the automatic gain controller 31 (FIG. 3), is converted by the AD converter 32 to a digital signal shown in FIG. 9B. The local oscillation means 45, placed under software control, generates local oscillation signals of in-phase and quadrature components depicted in FIGS. 9C and D. The digital signal of FIG. 9B and the local oscillation signals of FIGS. 9C and D are multiplied by the multiplying means $42I$ and $42_Q$, respectively. As a result, the in-phase and the quadrature component of the output from the quadrature demodulation means 33 become such as depicted in FIGS. 9E and 9F. The thus multiplied in-phase and quadrature components are spectrum shaped by the independent digital filter means 34 placed under software control. In consequence, the spectrum-shaped baseband signal has such in-phase and quadrature components as shown in FIGS. 9G and 9H. In this way, even if the modulation scheme or mode of the send signal changes from QPSK to 16QAM and BPSK one after another at time intervals as short as 4 milliseconds during transmission, the signal can accurately be reproduced by the digital signal detector of the present invention. This modulated signal is transmitted and received at rates of 2 bits by QPSK, 4 bits by 16QAM and 1 bit by BPSK per symbol. Thus, the digital signal detector of the present invention implements the detection of signals in the variable-bit transmission. In this example, it is preknown that the QPSK, 16QAM and BPSK modulated signals are sequentially received every 4 milliseconds, and the control means 35 switches variables for respective means in synchronization with the received signals.

Figure 1A:
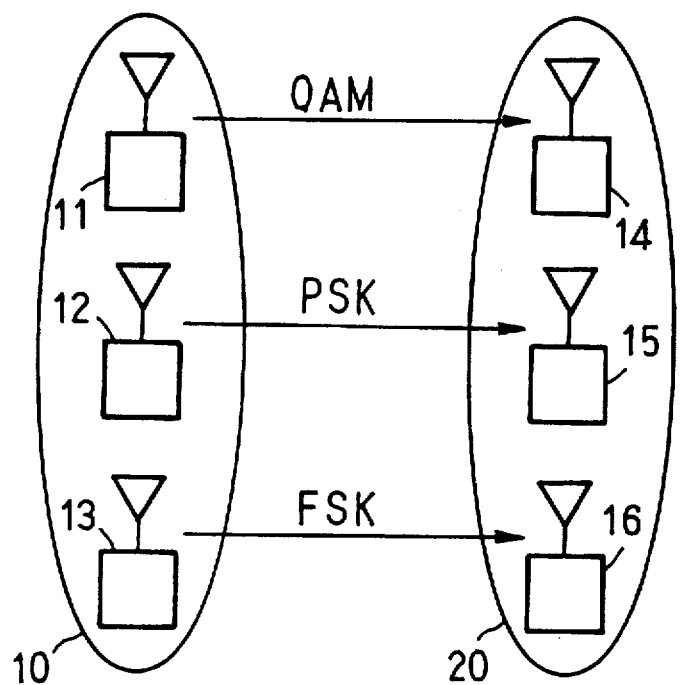
FIG. 1A is a block diagram schematically showing an example of a digital mobile radio communication system employing a plurality of different modulation/demodulation schemes.
Figure 1B:
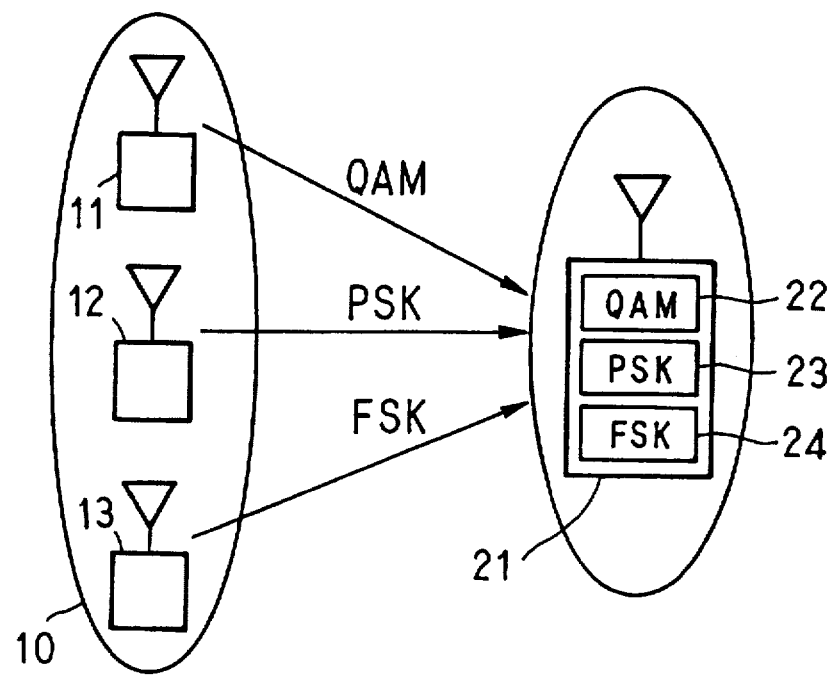
FIG. 1B is a block diagram schematically showing an example of a digital mobile radio communication system employing a receiver which contains a plurality of detectors each corresponding to one of the modulation/demodulation schemes in FIG. 1A.
Figure 2B:
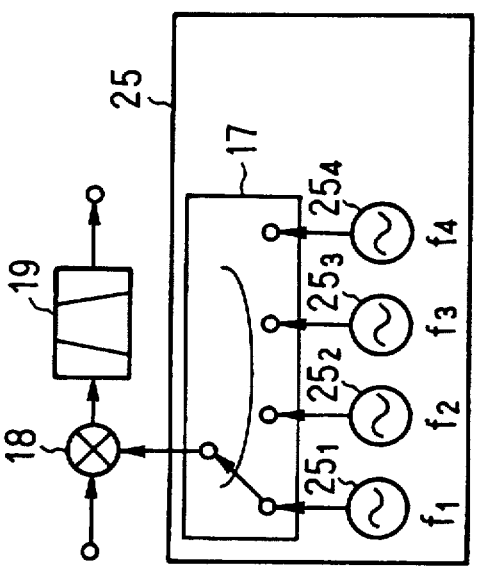
FIG. 2B is a diagram showing a conventional method for changing the local oscillation frequency of a detector in response to the variations in the carrier frequency shown in FIG. 2A.
Figure 2D:
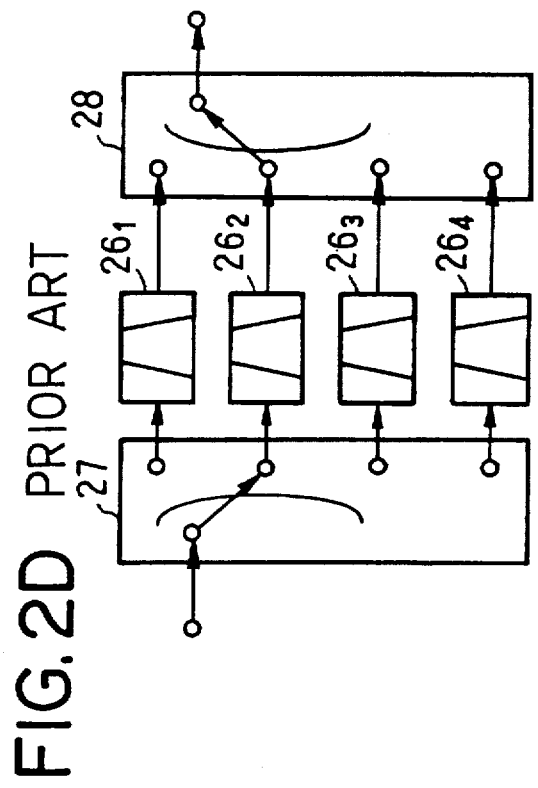
FIG. 2D is a diagram showing a conventional method for switching band-limiting filters of a detector in response to the variations in the symbol transmission rate shown in FIG. 2C.
Figure 2A:
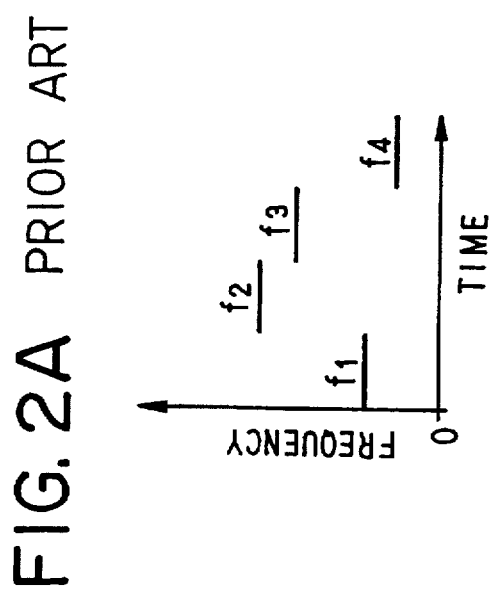
FIG. 2A is a graph showing variations in the carrier frequency of a received signal with the lapse of time.
Figure 10A:
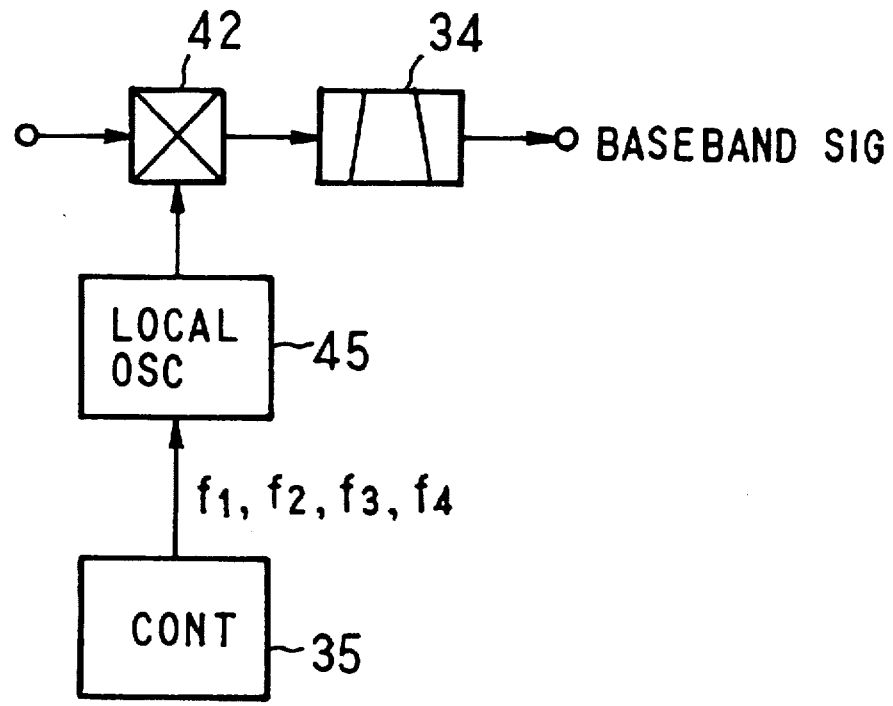
FIG. 10A is a block diagram illustrating an example of the functional configuration for switching the oscillation frequency in the quadrature demodulating means 33 in FIG. 3.

To switch the local oscillation frequency in response to the change in the modulation scheme, the control means 35 sends a frequency switching command to the local oscillation means 45 as shown in FIG. 10A. The local oscillation means 45 is implemented basically by software, and for the designated frequency f, an operation $f_{L1}B_L \exp(j2\pi fmT_s)$ is performed. In the case of switching the frequency as shown in FIG. 2A, the control means 35 instructs the local oscillation means 45 to switch the oscillation frequency in order $f_1$-$f_2$-$f_3$-$f_4$. This instruction is executed in an instruction execution cycle of a microprocessor which executes software in principle. Hence, the local oscillation frequency can be switched fast in as short a time as several nanoseconds. As will be seen from the above, according to the present invention, the frequency of the local oscillation means 45 can be switched faster than in the past and the frequency switching during communication can be fully dealt with, besides the invention is also applicable to fast frequency hopping for dynamic switching of the carrier frequency.

Figure 2C:
FIG. 2C is a graph showing variations in the symbol transmission rate of the received signal with the lapse of time.
Figure 10B:
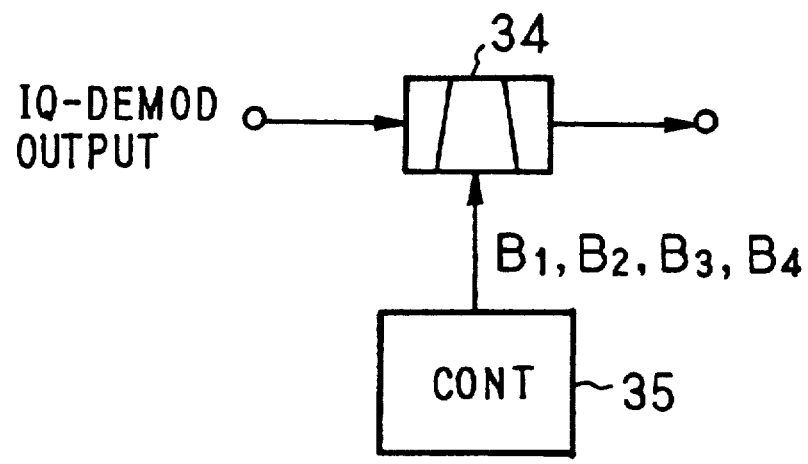
FIG. 10B is a block diagram showing an example of the functional configuration for switching the local oscillation frequency in the filter means 34 in FIG. 3.

In response to a change in the symbol transmission rate, too, the present invention similarly changes the characteristic of the filter means 34 through a program of software; the instruction to change the transmission rate is provided by the control means 35. That is, the filter means 34 and the control means 35 implement digital signal processing by software. For example, when the transmission rate varies as shown in FIG. 2C, the symbol transmission rates B1, B2, B3 and B4 are sequentially indicated from the control means 35 to the filter means 34 as depicted in FIG. 10B. Accordingly, the transmission rate is varied in an instruction execution cycle of a microprocessor which executes software in principle. Thus, according to the present invention, the characteristic of the filter means 34 can be changed by the control means 35 at high speed. The characteristic control of the filter means 34 is effected according to the modulation mode of the received signal as well. For example, when the modulation mode changes as shown in FIG. 9G, the roll-off of the filter characteristic is changed to 0.5 for QPSK, 0.3 for 16QAM and 0.5 for BPSK.

Figure 11:
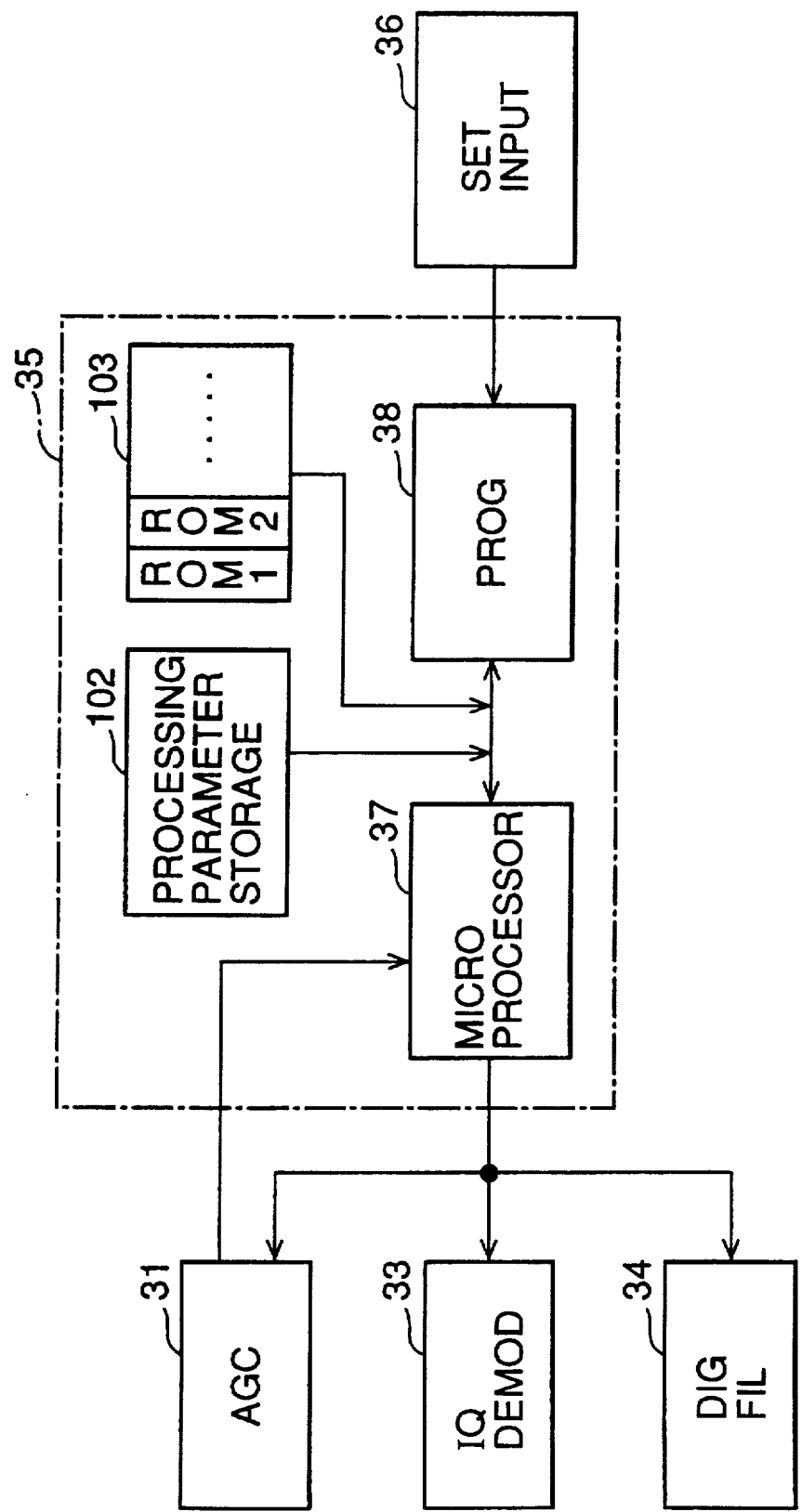
FIG. 11 is a block diagram illustrating an example of the functional configuration for carrying out this invention method.

As described above, various processes involved in the present invention are performed by software operations. That is, as shown in FIG. 11, a microprocessor 37 in the control means 35 decodes and executes a program 38 in the control means 35 to control the automatic gain controller 31, the quadrature demodulation means 33 and the digital filter means 34. The automatic gain controller 31 is controlled as follows. The output level of the automatic gain controller 31 is detected by a level detector (not shown), the detected level is converted to a digital value, which is compared with a reference value in the microprocessor 37, and the amplification gain is controlled step by step to bring the output of the automatic gain controller 31 into a predetermined range of amplitude variations. The control of the quadrature demodulation means 33 is effected by controlling the local oscillation means 45, the n-point interpolation means 41 and the n-point decimation means 43. As regards the local oscillation means 45, the frequency f, phase $\phi$ and amplitude $B_L$ of the local oscillation signal are designated by the microprocessor 37. For the n-point interpolation means 41 and the n-point decimation means, the sampling frequency $1/T_s$ and the numbers n of interpolation and decimation points are designated. The digital filter means 34 is controlled through the smoothing means 51 and the digital filter means 52. For the smoothing means 51, the sampling frequency $1/T_s$, the number of smoothing points and the smoothing method are designated. For the digital filter means 52, the sampling frequency $1/T_s$, the filter coefficient and the number of symbols necessary for filtering are designated. That is, once the carrier frequency of the input modulated signal of the AD converter 32 is set and input, the minimum value of its sampling frequency $1/T_s$ is automatically determined in accordance with the input carrier frequency. For example, when the carrier frequency of the input modulated signal is 130 MHz, the minimum value of the sampling frequency of the AD converter 32 is set at 260 MHz. For accurate synchronization with the carrier of the input modulated signal, the local oscillation signal needs to be a digital signal of a sampling frequency at least four times higher than the carrier frequency of the input modulated signal; therefore, the numbers n of interpolation points and decimation points are automatically determined. Where the conversion rate of the AD converter 32 is high, it is also possible to sample the input modulated signal above the minimum sampling frequency to reduce the number n of samples to be interpolated and decimated correspondingly.

When the frequency of the demodulated baseband signal is, for example, 20 KHz, the sampling frequency necessary for this signal processing may be 40 KHz; since the quadrature demodulation means 33 outputs an unnecessarily large number of signals, these signals are effectively used to perform processing by the smoothing means 51 to produce a base band signal as faithful to them as possible and decrease its sampling frequency. The number of smoothing points in this case is automatically determined by the set carrier frequency of the input modulated signal and the set symbol transmission rate. As described previously with reference to FIGS. 2D and 10B, an appropriate filter characteristic is needed in accordance with the symbol transmission rate, and hence the filter coefficient and the number of symbols necessary for filtering are automatically determined by the set symbol transmission rate. Further, the filter coefficient is automatically determined, depending on the set modulation mode as mentioned previously. Thus, programs are prepared so that various parameters (variables) for the filter means 34, the local oscillation means 45, the interpolation means 41 and the decimation means 43 are automatically designated in accordance with the carrier frequency, the symbol transmission rate and the modulation mode which are set on the basis of the above-mentioned relations.

In the present invention, it is possible to employ what is called a distributed processing system in which microprocessors are provided for the quadrature demodulation means 33 and the digital filter means 34, and these microprocessors are supplied with the above-mentioned various parameters (variables) designated by the microprocessor 37 and use them as arguments to execute programs for interpolation, quadrature demodulation and decimation and programs for smoothing and filter processing, respectively. Of course, such a distributed processing system may be substituted with a centralized processing system in which the microprocessor 37 itself designates first the parameters for the respective means and executes the interpolation, quadrature demodulation, decimation, smoothing and filtering programs on a time-sharing basis, thereby performing virtually parallel processing.

Figure 12:
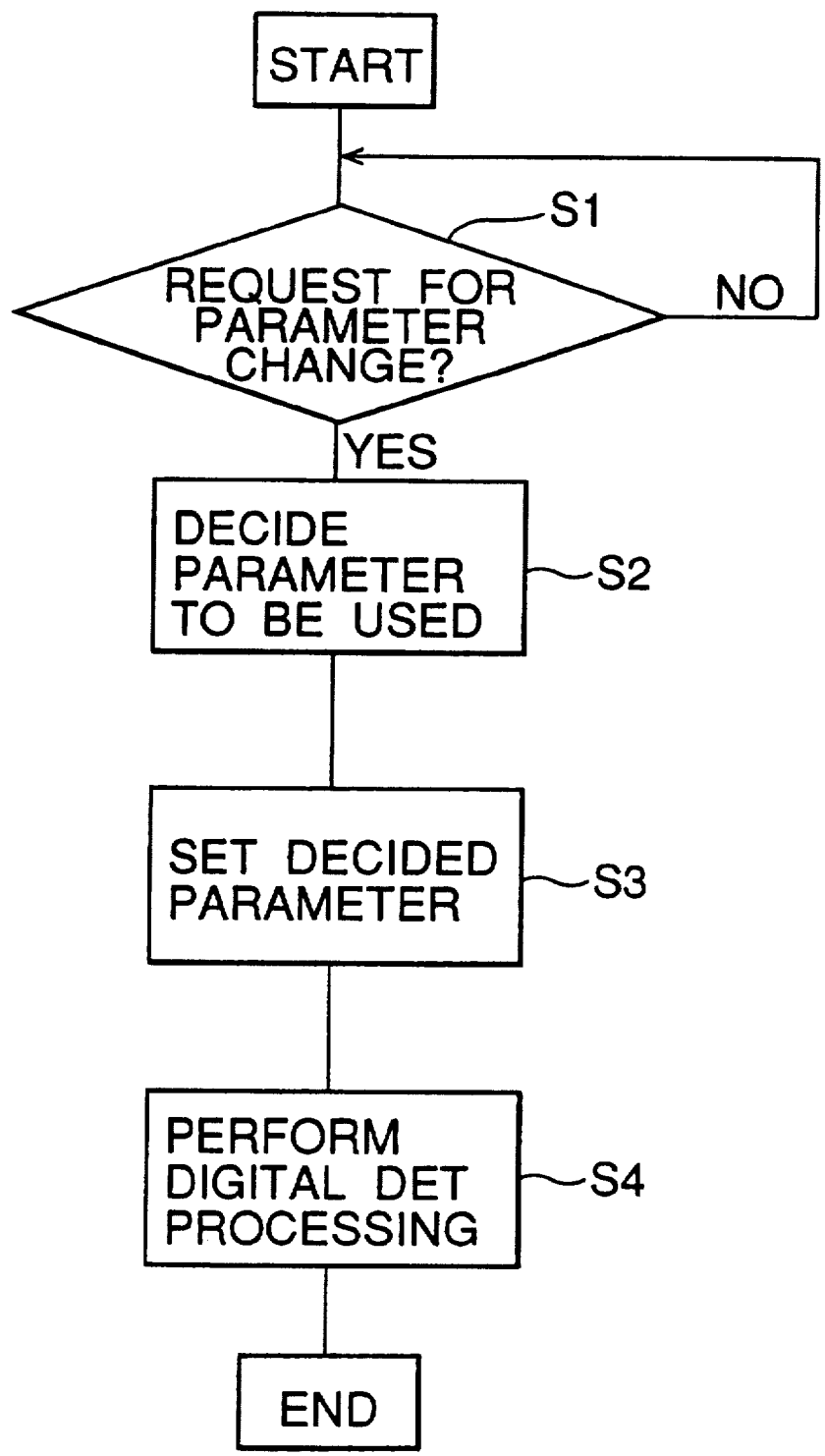
FIG. 12 is a flowchart showing an example of the procedure of the detecting method according to the present invention.
Figure 14:
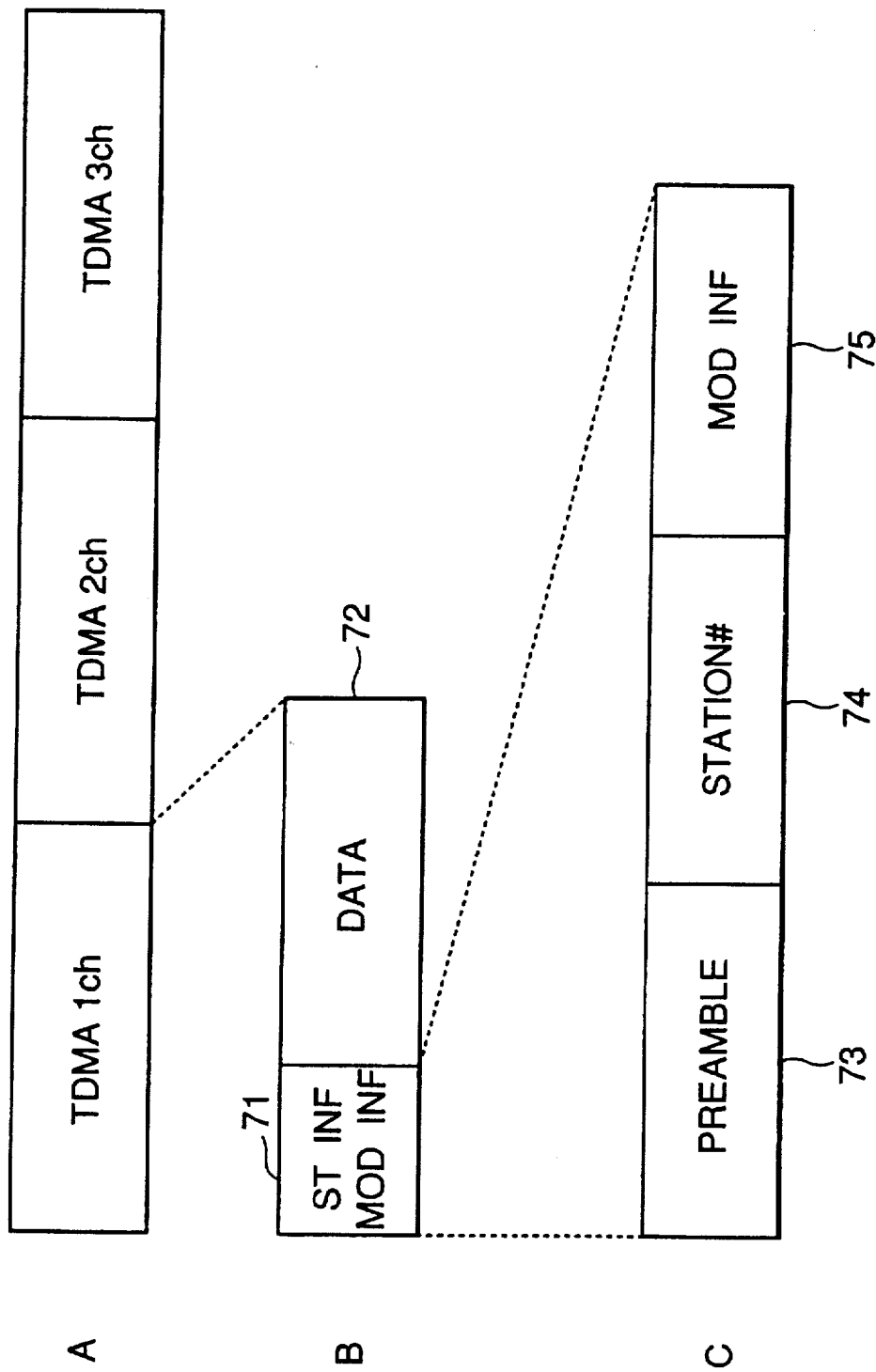
FIG. 14 is a diagram showing an example of the frame structure of the received signal.

FIG. 12 is a flowchart showing the procedure of the digital detector. The procedure begins with making a check to see if a request is made for a variable change (S1). Such a variable change request is made when a change in the carrier frequency or symbol transmission rate is newly set and input via set/input means 36, or when the time of changing the modulation mode arrives which is preknown as described previously with reference to FIG. 9, or when switching between the 800 Mhz and 1500 MHz or between audio and still picture information is input via the set/input means as referred to previously in the section "BACKGROUND OF THE INVENTION." FIG. 14 is explanatory of the case where the received signal is a 3-channel time division multiplex signal. The frame for each channel is composed of a preamble 71 and data 72 as shown in FIG. 14B. The preamble 71 is composed of a synchronization word 73 and a base station number 74 together with modulation system information 75 such as the modulation scheme of the data used in the data frame 72 and the symbol transmission rate as shown in FIG. 14C. For example, in the case where the modulation scheme of the data in the data frame 72 is newly designated, the variable change request is considered to be made when the data indicating the modulation scheme is demodulated.

When such a variable change request is made, the variables to be changed and their values are determined to comply with the request (S2). For example, when the request is made for changing the variables for quadrature demodulation, the newly determined variables such as the number n of interpolation points, the local carrier frequency and its amplitude and phase are set as arguments in the processor which executes the quadrature demodulation program (S3). This is followed by the execution of the digital detection program (S4).

Figure 13:
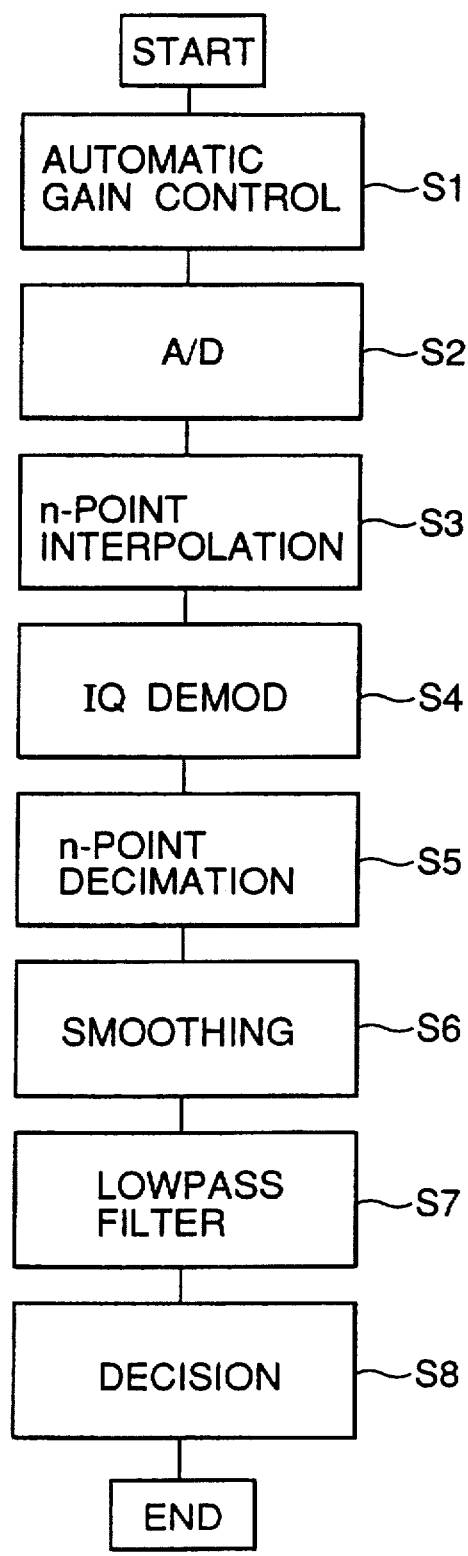
FIG. 13 is a flowchart showing an example of the digital detecting procedure.

FIG. 13 shows the procedure for digital detection. In the first place, the received signal is subjected to automatic gain control by the automatic gain controller 31 in FIG. 11 so that the level of the received signal falls within a predetermined range (S1). The thus gain-controlled received signal is converted by the AD converter 32 to a digital signal (S2), which is subjected to an n-point interpolation (S3), and the thus interpolated digital signal is subjected to the quadrature demodulation operation (S4). The demodulation result is subjected to n-point decimation processing (S5) and then smoothing processing (S6), and the smoothing result is subjected to low-pass filter processing (S7). This is followed by a signal point decision to decide which signal point on the IQ plane corresponds to the result of the low-pass filter processing (S8).

Figure 15:
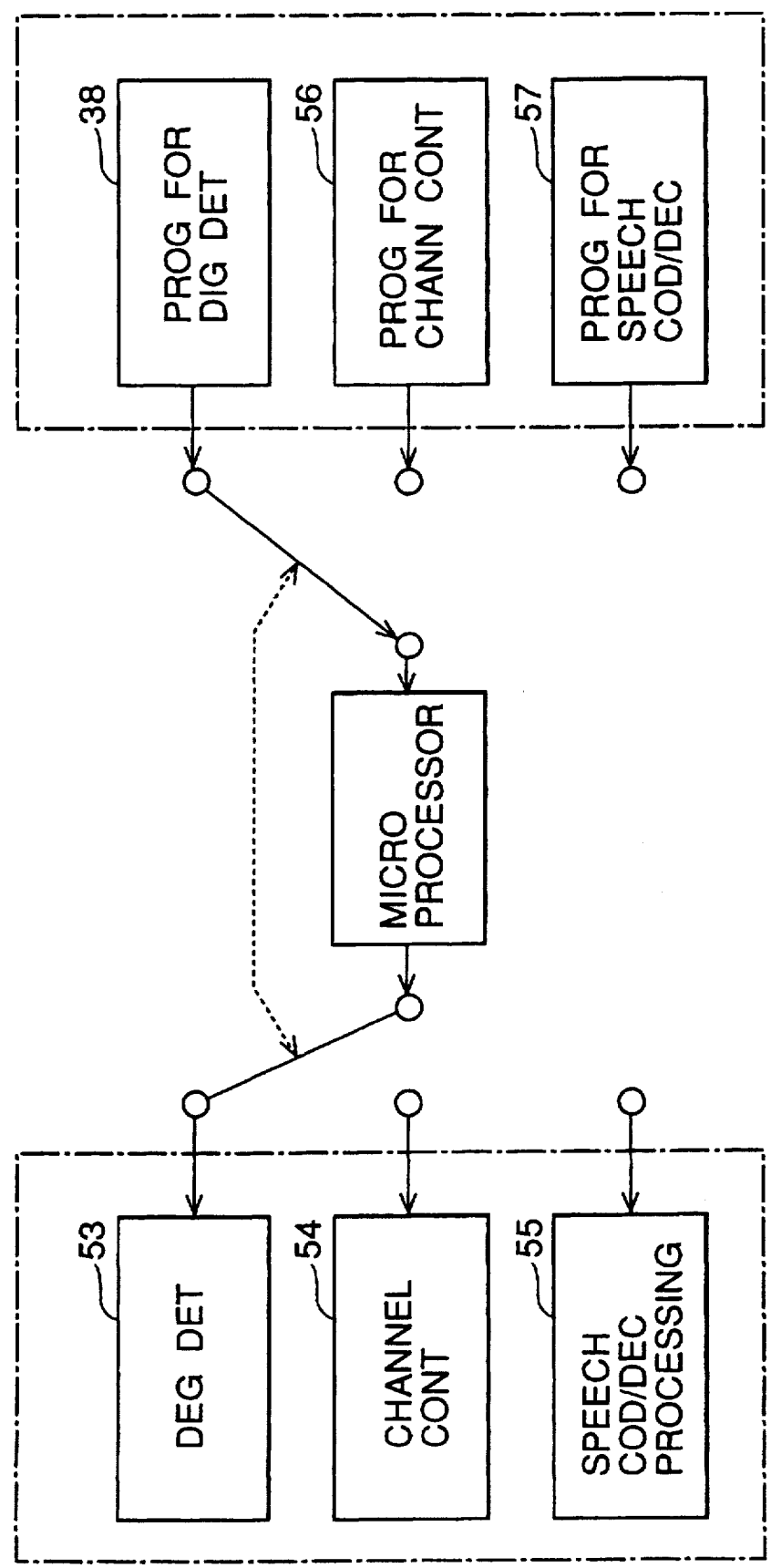
FIG. 15 is a block diagram illustrating an example of the functional configuration in which a microprocessor for use in the present invention is utilized for other processing.

As depicted in FIG. 15, the digital detector 53 of the present invention built in a radio, a radio channel controller 54 and an audio encoding/decoding processor 55 may be placed under the time sharing control of the microprocessor 37. Control programs 38, 56 and 57 are prepared which are exclusive to the digital detector 53, the radio channel controller 54 and the audio encoding/decoding processor 55, respectively. The microprocessor 37 switches each of the digital detector 53, the radio channel controller 54, the audio encoding/decoding processor 55 and its control program at proper time intervals on a time sharing basis. Accordingly, a plurality of objects of control can be processed by the single microprocessor 37. Incidentally, this radio is a mobile station of a mobile communication system, for instance, and the radio channel controller 54 performs switching between control and communication channels.

Figure 16:
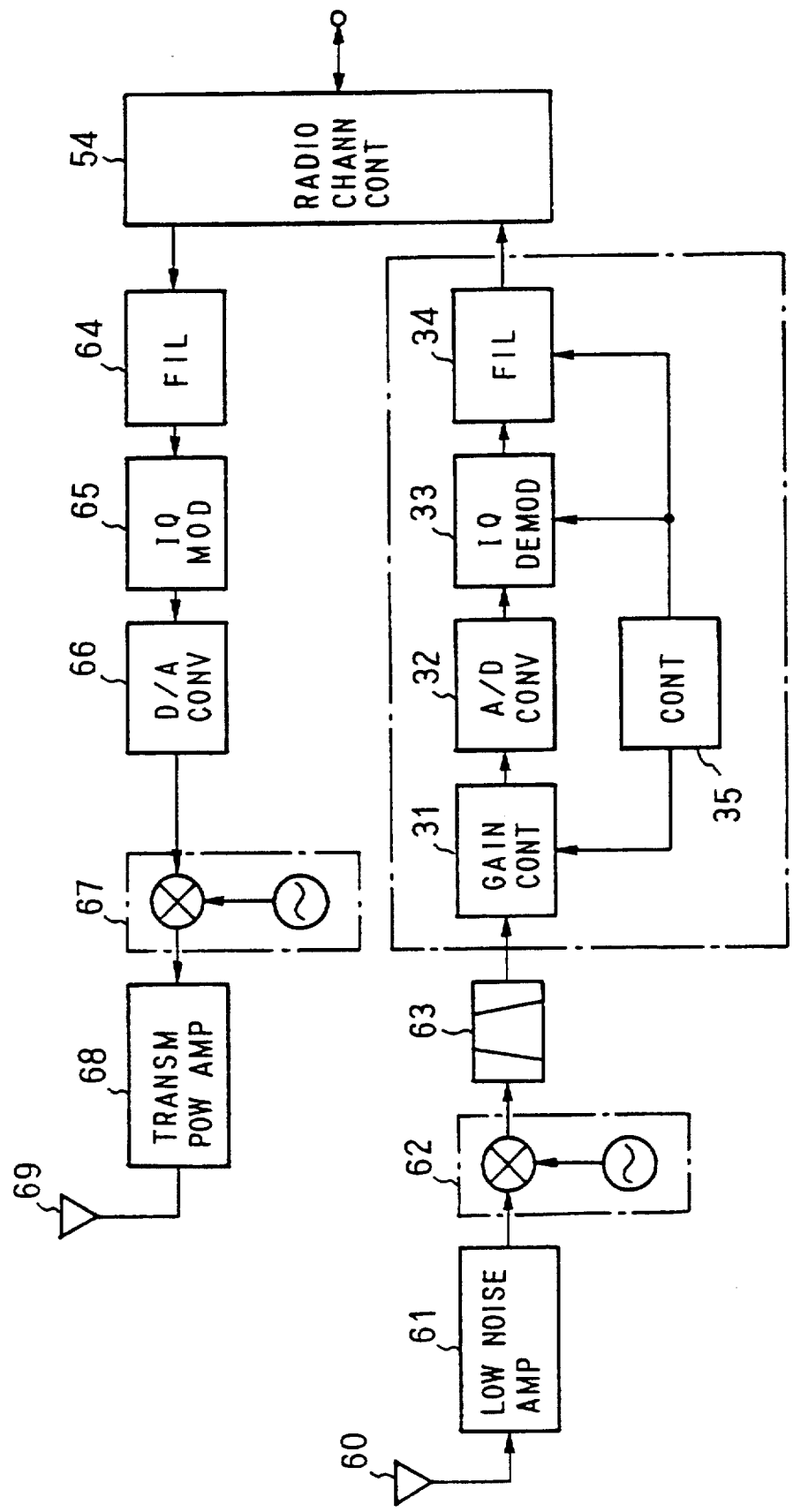
FIG. 16 is a block diagram illustrating the functional configuration of a transceiver embodying the present invention.

FIG. 16 illustrates a digital radio communication transceiver which has the digital detector of the present invention built-in, the parts corresponding to those in FIG. 3 being identified by the same reference numerals. The received modulated signal from an antenna 60 is amplified by a low-noise amplifier 61, then converted by frequency converting means 62 to an intermediate-frequency (IF) signal, which is band limited by a filter 63, thereafter being fed to the automatic gain controller 31. That is, the received signal is applied to the digital detector of the present invention, shown in FIG. 3, and the detected output, i.e. the output from the filter means 34 is applied to the radio channel controller 54, from which it is fed to an exchange of a network (not shown), for instance. A signal from the exchange is fed via the radio channel controller 54 to filter means 64, wherein it is band limited. The band-limited signal is applied to quadrature modulating means 65, wherein its IF carrier is quadrature-modulated. The modulated output, i.e. the modulated signal is converted by a DA converter 66 to an analog signal, which is further converted by a frequency converter 67 to a high-frequency signal. The high-frequency modulated signal is power amplified by a transmitting power amplifier 68 for transmission from an antenna 69.

Next, concrete examples of the present invention will be described.

(i) Mobile Multimedia

Here, the control operation of the present invention will be described with respect to the cases where the mode setting is (1) manually changed by the user of a mobile station, (2) automatically changed by a command from a base station, and (3) automatically changed according to an autonomous decision by the mobile station. Now, let it be assumed that the audio service is of a conventional PDC (Personal Digital Cellular) system whereas multimedia service (service of receiving broadcast still pictures, for instance) is of a multilevel modulation system (160QAM, for instance). The transmission bandwidth is supposed not to change with the services. Further, assume that the service is switched from a speech to a still picture mode and that the media service is being broadcast in a predetermined frequency band.

(1) When switching the reception of the audio service to the media service such as still picture, the user of the mobile station changes the service mode of the mobile station. This change is made by a dial key or mode switch provided in the set/input means 36 (FIG. 11). When supplied with a request signal for mode switching from the audio to the media service mode, for instance, the control means 35 of the mobile station changes the process variables of a synthesizer (not shown) for channel selection, the gain controller 31, the quadrature demodulation means 33 and the filter means 34. In the synthesizer, its frequency is set in a predetermined frequency band. In the gain controller 31, the setting of the maximum amplitude of its input signal is changed. That is, since the modulation mode is switched from QPSK to QAM, the maximum set value of the input signal is made larger than in that for QPSK. For the quadrature demodulation means 33 the setting of the numbers n of interpolation points and decimation points is changed. The value n is made larger than that for QPSK. The process variables of the filter means 34 that are changed are the smoothing method, the filter coefficient and the filter order. In this instance, a plurality of smoothing methods optimum for the modulation schemes used are prepared and algorithms of these optimum smoothing methods are prestored in a ROM. Based on the service mode switching signal applied thereto, the control means 35 reads out of the ROM the smoothing method optimum for the specified mode and performs smoothing processing accordingly. The roll-off rate of the filter means 52 (FIG. 7) is made lower than in the case of QPSK and, at the same time, its coefficient and order are also changed.

With a view to changing various process variables according to the mode being set, control means 35 includes process variable storage part 102 and a smoothing method storage part 103 as shown in FIG. 11. In the process variable storage part 102, for example, as shown in FIG. 17A, there are stored for each of the audio and the picture mode, the maximum amplitude value of the automatic gain controller, the number n of interpolation points, the number of the ROM having stored therein an algorithm for smoothing processing, the roll-off rate and the filter coefficient of the filter means. In accordance with the mode set and input, the control means 35 reads out these variables and uses them for respective particular purposes. In the smoothing method storage part 103 there are stored the numbers of the ROMS which have stored therein algorithms or procedures necessary for the execution of various smoothing processes. In order to receive services other than the audio and picture or visual services, process variables for such service modes may be stored in the process variable storage part 102.

(2) The user of the mobile station changes the service mode setting of the mobile station by the set/input means 36 as in the case (1). Upon receipt of the service mode change request, the control means 35 of the mobile station transmits it, together with a flag indicating the mode change, over a transmission channel for communication with the base station. To set a flag is to make a predetermined bit 0 or 1 on the transmission frame a 1 or 0. When receiving the service change request flag from the mobile station (a request for media service in this example), the base station sends transmission information on the media service via a downlink channel to the mobile station. The mobile station detects the transmission information from the base station by the radio channel controller 54 (FIG. 16). in the thus detected transmission information there are contained the modulation scheme and the transmission rate to be used in the data frame of the radio channel, the time slot in the TDMA frame to be used, and so forth. The mobile station and the base station exchanges signals over the radio channel several times concerning the new service mode, as required. The detected transmission information is input as a variable change request signal into the control means 35. The control means 35 changes the variables for the synthesizer, the gain controller, the quadrature demodulation means and the filter means. The contents to be changes are the same as those in the case (1).

In this instance, the process variable storage part 102 is designed so that the maximum amplitude value, the interpolation point number n and the ROM number of the smoothing method are read out in accordance with the modulation mode specified by the base station as shown in FIG. 17B and the roll-off rate and the filter coefficient are read out in accordance with the symbol transmission rate specified by the base station as shown in FIG. 17C.

(3) The user of the mobile station changes the setting of the service mode of the mobile station as in the case (1). In this case, several combinations of modulation schemes and symbol transmission rates are predetermined for each of the audio and media services and are assigned different mode numbers, and the respective process variables are stored in the process number storage part 102 in correspondence with the mode numbers as shown in FIG. 17A. The relationships of the mode numbers to the modulation schemes and the symbol transmission rates are also held in the base station. When a service mode change is set and input, the control means 35 transmits a code indicating the number of the set mode to the base station over the transmission channel for communication therewith. Further, the control means 35 reads out of the storage part 102 the process variables corresponding to the set and input mode and uses the read-out process variables to perform detection processing.

The base station receives and responds to the mode number indicating the newly set service mode to change the setting of the modulation scheme, the transmission rate and the time slot of the TDMA frame which are used in the radio channel for the transmission of information to the mobile station. As required, the mobile station and the base station exchange signals over the radio channel several times concerning the service mode to be newly changed.

(ii) Compatible Mobile Station

Here, the control operation of the present invention will be described with respect to the cases where the mode setting is (1) manually changed by the user of a mobile station, (2) automatically changed by a command from a base station, and (3) automatically changed according to an autonomous decision by the mobile station. Assume that the mobile station has gone indoors (a closed space like an underground shopping center). Suppose that the mobile station receives the PDC audio service outdoors and 16QAM media service indoors and that the transmission band remains unchanged.

(1) The user changes the communication mode setting of the mobile station when he goes indoors. This is done using a dial key or dedicated mode change switch of the set/input means 36. Upon receipt of a communication mode change request, the control means 35 changes the setting of the oscillation frequency of the synthesizer. For example, when the 800 MHz band is used outdoors and 1500 MHz band indoors, the local oscillation frequency to be supplied to the frequency converter for conversion to an IF signal is changed for use in the 1500 MHz band. Since the modulation scheme is switched from QPSK to 16QAM as is the case with the mobile multimedia (i), the control means 35 makes the maximum amplitude value of the gain controller large, sets the number n of interpolation and decimation points in the quadrature demodulation to a value larger than in the case of QPSK, uses a ROM having stored the optimum smoothing method, makes the roll-off rates of the filter means 64 at the sending side (FIG. 16) and the filter means 34 at the receiving side (FIG. 16) small, and changes their filter coefficients.

(2) The user of the mobile station changes the communication mode setting of the mobile station by the set/input means 36 when he goes indoors. The mobile station flags a communication mode change signal on the transmission frame of the radio channel to the base station. The base station receives the service change request flag from the mobile station and supplies it with transmission information about the communication mode over the down-link channel. The mobile station detects the transmission information from the base station by the radio channel controller 54. In the detected transmission information there are contained the carrier frequency, the modulation scheme, the transmission rate and the time slot of the TDMA frame which are used in the radio channel. Based on the transmission information, the mobile station changes the process variables which are used in the synthesizer, the quadrature modulation means, the gain controller, quadrature demodulation means and the filter means. The contents of the changes are the same as in the case (1).

(3) As in the cases (1) and (2), the user of the mobile station changes the setting of the communication mode of the mobile station when he goes indoors. In this instance, there are predetermined a plurality of modes corresponding to several combinations of modulation schemes and symbol transmission rates, and the mobile station informs the base station of changing the communication mode setting through the radio channel. The base station responds to the signal from the mobile station to set a predetermined communication mode. At this time, the settings are the carrier frequency, modulation scheme, transmission rate and the time slot of the TDMA frame which are used in the radio channel. The base station and the mobile station exchange signals several times over the radio channel and then communicate with each other in the newly set communication mode. Based on the newly set communication mode, the mobile station reads the process variable storage part 102 and changes the variables which are used in the synthesizer, the quadrature demodulation means, the gain controller,the quadrature demodulation means and the filter means. The contents of these changes are the same as in the cases (1) and (2).

In the above, the variables to be used in the gain controller 31, the quadrature demodulation means 33 and the digital filter means 34 are all changed according to every mode switching. This is a preferred example. For example, when the modulation scheme is changed to QAM, at least the maximum amplitude value of the gain controller 31 is changed to ensure accurate detection of the amplitude value of the received signal and the other variables need not be changed. In the case of switching to the QPSK modulation scheme, the change of the maximum value of the gain controller 31 need not be given priority because the amplitude information is not used. The change of the roll-off rate in the filter means 34 and the corresponding changes of the filter coefficient and filter order are relatively important. Next in the order of importance comes the number of interpolation points, followed by the choice of the smoothing method. The necessity of changing the variables decreases in descending order of their importance.

While in the above the present invention has been described as being applied to the reception of radio signals, the invention is also applicable to the reception of signals in a wired communication system in which the modulation scheme and the symbol transmission rate are switched to those optimum for each information. In such an instance, the automatic gain controller 31 can be dispensed with.

As will be appreciated from the above, the present invention is advantageous over the prior art in the respects listed below.

(i) A plurality of modulation schemes can be dealt with;

(ii) A plurality of local oscillation frequencies can be dealt with;

(iii) A plurality of symbol transmission rates can be dealt with;

(iv) Variable bit transmission and variable symbol rate transmission can be implemented with one receiver;

(v) A completely quadrature demodulated wave can be generated; and (vi) The invention is applicable to fast frequency hopping.

It will be apparent that many modifications and variations may be effected without departing from the scope of the novel concepts of the present invention.

What is claimed is:

1. A digital detection method comprising:

an AD conversion step of converting a received modulated signal from analog to digital form;

a quadrature demodulation step of performing a digital quadrature-demodulating operation on said converted digital signal using a local oscillation signal of a local oscillation frequency as a processing variable;

a filtering step of performing a digital low-pass filtering operation on said quadrature-demodulated digital signal using filter characteristics as processing variables; and a control step of changing at least one of the processing variables in any one of said quadrature demodulation step and said filtering step in response to a variable change request, a change of a processing variable in said quadrature demodulation step being in accordance with a carrier frequency of the modulated signal, and a change of a processing variable in said filtering step being in accordance with the modulation scheme and transmission rate of the modulated signal.

2. The method of claim 1, wherein said quadrature demodulation step comprises:

an interpolation step on performing n-point interpolation processing on said digital signal to interpolate therein samples at n points, said n being an real number equal to or greater than 1;

a multiplication step of complex-multiplying the result of said n-point interpolation by said local oscillation signal; and a decimation step of performing n-point decimation processing on the result of said complex-multiplication to decimate therefrom samples at n points.

3. The method of claim 2, wherein said filtering step comprises:

a smoothing step of performing smoothing processing on the result of said quadrature demodulation to reduce the number of samples of the time base; and a digital filter step of performing band-limiting operation on the result of said smoothing processing using said filter characteristics.

4. The method of claim 2, wherein said interpolation step is a step of performing discrete Fourier transform processing on said digital signal and performing inverse discrete Fourier transform on the result of said Fourier transform processing after adding thereto a zero coefficient to obtain said result of said interpolation processing.

5. The method of claim 2, wherein said interpolation step is a step of performing a linear interpolation which approximates an m-th order function to said digital signal and interpolates therein samples which fit said m-th order function.

6. The method of claim 2, wherein said interpolation step is a step of interpolating samples estimated by an adaptive algorithm used for those preceding them in said digital signal every predetermined number of samples.

7. The method of claim 2, wherein said interpolation step is a step of decimating from said multiplication result said samples interpolated at said n points in said interpolation step.

8. The method of claim 2, wherein said decimation step is a step of processing a sequence of samples of said multiplication result by an evaluation function every predetermined number of samples to obtain one sample.

9. The method of claim 2, further comprising a step of synchronizing said local oscillation signal with said digital signal.

10. The method of claim 9, wherein said synchronizing step comprises the steps of:

synchronizing the frequency of said local oscillation signal with said digital signal; and time-synchronizing said frequency-synchronized local oscillation signal with said n-point interpolated digital signal.

11. The method of claim 2, wherein said at least one processing variable in said quadrature demodulation step is the number n of interpolation points.

12. The method of claim 2, wherein said at least one processing variable in said quadrature demodulation step is the local oscillation frequency of said local oscillation signal.

13. The method of claim 3, wherein said at least one processing variable in said filter step is the number of smoothing points where to reduce said number of samples.

14. The method of claim 3, wherein said at least one processing variable in said filter step is a filter characteristic in said digital filter step.

15. The method of any one of claims 3 and 9 to 14, further comprising a gain control step of controlling the maximum amplitude of said received modulated signal to be a set value which is said at least one processing variable.

16. The method of claim 15, further comprising:

a variable change request detecting step of detecting a variable change request;

a processing variable determining step of responding to said variable change request to determine which processing variable is to be changed and its value; and a step of changing said processing variable to said determined variable.

17. The method of claim 16, wherein each of said steps is executed by decoding and executing a program.

18. The method of claim 17, wherein said processing variable determining step is a step of reading out a prestored processing variable in response to said variable change request.

19. The method of claim 18, wherein said variable change request is input by manipulating set/input means.

20. The method of claim 18, wherein said variable change request detecting step is a step of detecting said variable change request from a received signal.

21. A digital detector comprising:

an AD converter for converting a received modulated analog signal to a digital signal;

quadrature demodulation means for performing a digital quadrature demodulating operation on said digital signal output from said AD converter using a digital local oscillation signal of a local oscillation frequency as a processing variable;

filter means for performing a digital lowpass-filter operation on the quadrature demodulated digital signal using filter characteristics as processing variables;

input means for inputting a processing variable change request for changing a processing variable; and control means including means holding selectable data of at least one of modulation schemes, transmission rates and carrier frequencies, said control means being responsive to said processing variable change request and to said selectable data to change at least one process variable in at least one of said quadrature demodulation means and said filter means.

22. The detector of claim 21, wherein said quadrature demodulation means comprises:

interpolating means for performing n-point interpolation processing on said output digital signal from said AD converter to interpolate therein samples at n points, said n being a real number equal to or greater than 1;

local oscillation means for generating said digital local oscillation signal through digital operation;

multiplying means for complex-multiplying the result of said n-point interpolation and said digital local oscillation signal; and decimating means for performing n-point decimation processing on a digital signal resulting from said complex-multiplication to decimate therefrom samples at said n points.

23. The detector of claim 22, wherein said filter means comprises:

smoothing means for smoothing the output from said quadrature demodulation means and for performing an operation for reducing the number of samples of said output; and digital filter means for performing a band-limiting operation on the result of said operation by said smoothing means.

24. The detector of claim 23, further comprising an automatic gain controller provided at a stage preceding said AD converter, for controlling the gain of said received modulated signal so that its maximum amplitude becomes a set value which is one of said processing variables that can be changed by said control means.

25. The detector of claim 24, further comprising storage means having prestored therein a comparative table of variable change requests and processing variables, and wherein said control means is responsive to said input variable change request to read out said storage means and to change the processing variable corresponding to said read-out processing variable.

26. The detector of claim 25, wherein said input means is set/input means for inputting said variable change request by a manual operation.

27. The detector of claim 25, wherein said input means is means for detecting said variable change request from a received signal.

28. The detector of any one of claims 21 to 27, wherein said control means comprises a program and a microprocessor for decoding and executing said program.

29. The detector of claim 28, wherein said control means serves also as control means of a digital radio transceiver.

* * * * *